(12) United States Patent
Kurihara

(10) Patent No.: US 10,495,164 B2
(45) Date of Patent: Dec. 3, 2019

(54) WHEEL TYPE CONSTRUCTION MACHINE

(71) Applicant: Hitachi Construction Machinery Co., Ltd., Taito-ku, Tokyo (JP)

(72) Inventor: Takeshi Kurihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 29 days.

(21) Appl. No.: 15/761,833

(22) PCT Filed: Mar. 11, 2016

(86) PCT No.: PCT/JP2016/057764
§ 371 (c)(1),
(2) Date: Mar. 21, 2018

(87) PCT Pub. No.: WO2017/051549
PCT Pub. Date: Mar. 30, 2017

(65) Prior Publication Data
US 2018/0266505 A1    Sep. 20, 2018

(30) Foreign Application Priority Data
Sep. 24, 2015   (JP) ................................. 2015-186501

(51) Int. Cl.
*F16D 65/54*   (2006.01)
*B60P 3/00*    (2006.01)
(Continued)

(52) U.S. Cl.
CPC ............ *F16D 65/54* (2013.01); *B60B 35/125* (2013.01); *B60K 17/16* (2013.01); *B60P 3/00* (2013.01);
(Continued)

(58) Field of Classification Search
CPC ........ F16D 65/54; F16D 65/18; F16D 65/186; F16D 55/40; B60T 1/005; B60T 1/06;
(Continued)

(56) References Cited

U.S. PATENT DOCUMENTS 8,181,731 B2 * 5/2012 Bessho .................... B60K 5/04
                                                    180/305
9,150,049 B2 * 10/2015 Albergante ........... B60B 35/125
(Continued)

FOREIGN PATENT DOCUMENTS

JP    60-184729 A    9/1985
JP    2009-150486 A  7/2009
(Continued)

OTHER PUBLICATIONS

Japanese-language International Search Report (PCT/ISA/210) issued in PCT Application No. PCT/JP2016/057764 with English translation dated May 24, 2016 (four (4) pages).
(Continued)

*Primary Examiner* — Faye M Fleming
(74) *Attorney, Agent, or Firm* — Crowell & Moring LLP

(57) ABSTRACT

Brake mechanisms (33) that apply braking to rotations of left and right rotational shafts (25) each include a projecting part (40) that faces a partition wall (15A) of a brake case (15) and projects radially inward from an inner diameter side of a piston (37), an engaging member (41) that is arranged in the inner diameter side of the piston (37) in a state of being movably engaged with the projecting part (40) by a predetermined dimension in the left-right direction, and a pin member (42) that is provided between the partition wall (15A) of the brake case (15) and the engaging member (41). A frictional resistance between the pin member (42) and the partition wall (15A) is set to a value smaller than a pressing force of the piston (37) at the braking. The projecting part
(Continued)

(40) is provided with an engaging member insertion groove (40A) that the pin member (42) penetrates in the left-right direction, and the engaging member (41) is movably engaged with the projecting part (40) in the left-right direction.

4 Claims, 15 Drawing Sheets

(51) Int. Cl.
| | |
|---|---|
| *B60T 1/06* | (2006.01) |
| *F16D 55/40* | (2006.01) |
| *F16D 65/18* | (2006.01) |
| *F16H 48/08* | (2006.01) |
| *B60B 35/12* | (2006.01) |
| *B60K 17/16* | (2006.01) |
| *E02F 3/28* | (2006.01) |
| *E02F 9/20* | (2006.01) |
| *F16H 48/36* | (2012.01) |
| *F16D 121/04* | (2012.01) |

(52) U.S. Cl.
CPC ............... *B60T 1/06* (2013.01); *B60T 1/062* (2013.01); *B60T 1/065* (2013.01); *E02F 3/283* (2013.01); *E02F 9/202* (2013.01); *F16D 55/40* (2013.01); *F16D 65/18* (2013.01); *F16H 48/08* (2013.01); *F16H 48/36* (2013.01); *F16D 2121/04* (2013.01); *F16H 2048/368* (2013.01)

(58) Field of Classification Search
CPC .......... B60T 1/062; E02F 9/202; F16H 48/08; F16H 48/36
See application file for complete search history.

(56) References Cited

U.S. PATENT DOCUMENTS 9,765,826 B2 * 9/2017 Nishimoto ........... B60K 17/344
2010/0012447 A1 1/2010 Sakahara

FOREIGN PATENT DOCUMENTS

| JP | 2015-135004 A | 7/2015 |
|---|---|---|
| WO | WO 2004/109142 A1 | 12/2004 |

OTHER PUBLICATIONS

Japanese-language Written Opinion (PCT/ISA/237) issued in PCT Application No. PCT/JP2016/057764 dated May 24, 2016 (three (3) pages).

* cited by examiner

10,495,164 B2

WHEEL TYPE CONSTRUCTION MACHINE

TECHNICAL FIELD

The present invention relates to a wheel type construction machine such as a wheel loader that drives/rotates left and right wheels through an axle device, for example.

BACKGROUND ART

In general, for example, wheel loaders are known as a representative example of wheel type construction machines. In this wheel loader, a front vehicle body is swingably coupled to the front side of a rear vehicle body in a left-right direction, and a working mechanism including an arm and a bucket is mounted to the front vehicle body. On the other hand, an engine, a torque converter, a transmission, a hydraulic pump and the like are mounted on the rear vehicle body, which enables power of the engine to be transmitted to the transmission through the torque converter.

Further, an axle device is provided on each of the front vehicle body and the rear vehicle body to drive/rotate wheels in both left and right sides with connection of the axle devices to an output shaft of the transmission. The axle device is configured of a differential case that is arranged in an intermediate part in the left-right direction and an inside of which is a differential mechanism accommodating room; left and right brake cases that are arranged in both left and right sides of the differential case, the left and right brake cases each being defined by a partition wall to said differential mechanism accommodating room in said differential case, and an internal part of the brake case being formed as a brake mechanism accommodating room; a differential mechanism that is provided in the differential mechanism accommodating room in the differential case and distributes a drive force of the drive source to rotational shafts arranged in the left-right direction; left and right axle shafts that transmit rotations of the left and right rotational shafts of the differential mechanism to the left and right wheels; and left and right brake mechanisms that are provided in the respective brake mechanism accommodating rooms in the left and right brake cases to apply braking to the rotation of the rotational shaft in said differential mechanism.

Here, the brake mechanism is configured of a plurality of rotating discs that are mounted on the rotational shaft and rotate together with the rotational shaft; a plurality of non-rotating discs that are mounted in the brake case in a non-rotating state to face and be across the rotating disc in the left-right direction; and an annular piston that is provided in the brake case to face the non-rotating disc and presses the non-rotating disc on the rotating disc to generate a braking force.

The piston in the brake mechanism is provided with a pin member movable in the left-right direction. On the other hand, the partition wall of the brake case is provided with an annular plate that abuts on the piston member moving together with the piston, a spring member that urges the pin member to a direction opposing the pressing direction of each of the discs by the piston through then annular plate, and a stopper that positions the spring member (for example, refer to Patent Document 1). Thereby, in a case of releasing the pressing force of the piston having pressed each of the discs, it is possible to return back the piston by a prescribed dimension by the urging force of the spring member.

PRIOR ART DOCUMENT

Patent Document

Patent Document 1: WO 2004/109142

SUMMARY OF THE INVENTION

Incidentally, according to Patent Document 1, many components are used for returning back the piston by the prescribed dimension at the brake releasing. In addition, it is necessary to use a specific assembling tool and the like. Therefore, labors and hours are unfortunately required for the assembling work.

The present invention is made in view of the aforementioned problems in the conventional art, and an object of the present invention is to provide a wheel type construction machine that can cut down on the number of components and simplify shapes of individual components, therefore improving assembling workability of a brake mechanism.

A wheel type construction machine according to the present invention comprising: a vehicle body that is equipped with a drive source; an axle device that is provided in the vehicle body and is connected to the drive source to drive/rotate wheels in both sides in a left-right direction; and a working mechanism that is provided in the vehicle body, wherein the axle device including: a differential case that is arranged in an intermediate part in the left-right direction and an inside of which is a differential mechanism accommodating room; left and right brake cases that are arranged in both left and right sides of the differential case, the left and right brake cases each being defined by a partition wall to the differential mechanism accommodating room in the differential case, and an internal part of the brake case being formed as a brake mechanism accommodating room; a differential mechanism that is provided in the differential mechanism accommodating room in the differential case and distributes a drive force of the drive source to rotational shafts arranged in the left-right direction; left and right axle shafts that transmit rotations of the left and right rotational shafts of the differential mechanism to the left and right wheels; and left and right brake mechanisms that are provided in the respective brake mechanism accommodating rooms in the left and right brake cases to apply braking to the rotation of the rotational shaft in the differential mechanism, and the brake mechanism including: a plurality of rotating discs that are mounted on the rotational shaft and rotate together with the rotational shaft; a plurality of non-rotating discs that are mounted in the brake case in a non-rotating state to face and be across the rotating disc in the left-right direction; and an annular piston that is provided in the brake case to face the non-rotating disc and presses the non-rotating disc on the rotating disc to generate a braking force, characterized in that: the brake mechanism includes: a projecting part that faces the partition wall of the brake case and projects inward in a radial direction from an inner diameter side of the piston; an engaging member that is arranged in the inner diameter side of the piston in a state of being movably engaged with the projecting part by a predetermined dimension in the left-right direction to the projecting part of the piston; and a pin member that is provided between the partition wall and the engaging member for movably supporting the engaging member in the left-right direction to the partition wall of the brake case, wherein at least one frictional resistance of a frictional resistance between the pin member and the partition wall of the brake case and a frictional resistance between the pin member and the engaging member is set to a value smaller than the pressing force of the piston at the braking, and the projecting part of the piston is provided with an engaging member insertion part in which the engaging member is movably inserted in the left-right direction According to the present invention, the number of components can be reduced and shapes of the individual components can be simplified, thus improving the assembling workability of the brake mechanism.

MODE FOR CARRYING OUT THE INVENTION

Hereinafter, descriptions will be in detail made by taking a wheel loader as a representative example of a wheel type construction machine as an example according to embodiments in the present invention with reference to the accompanying drawings.

FIG. 1 to FIG. 12 show a first embodiment of the present invention. In the first embodiment, descriptions will be made by taking as an example a case where a projecting part of a brake mechanism is provided with an engaging member insertion groove in a notched shape in which an engaging member is inserted in a left-right direction and the engaging member is provided with an entirely circumferential engaging groove that is movably engaged with the engaging member insertion groove in the left-right direction.

Figure 1:
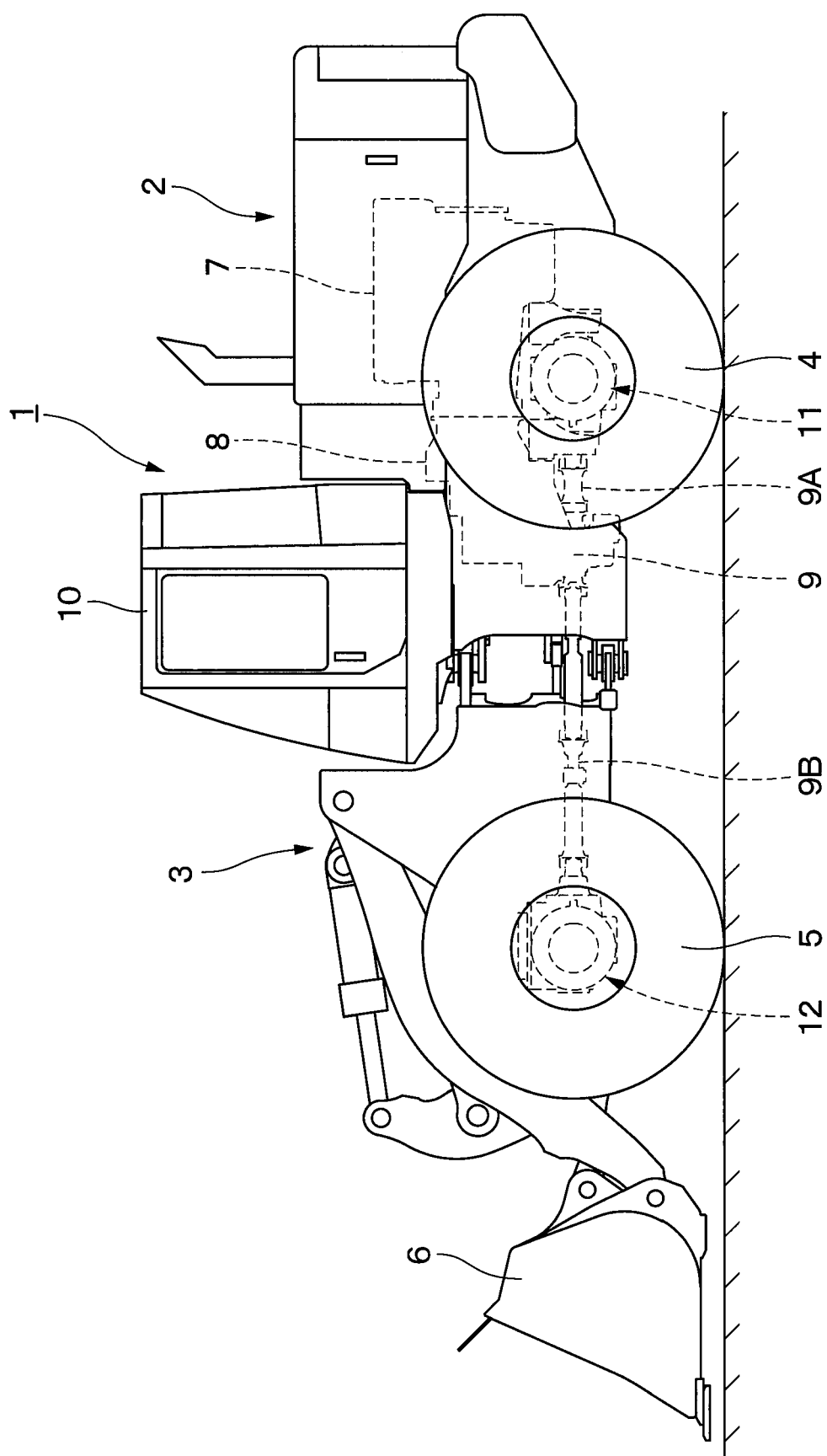
FIG. 1 is a front view showing a wheel loader according to a first embodiment of the present invention.

In FIG. 1, a wheel loader 1 according to the first embodiment configures a wheel type construction machine. The wheel loader 1 includes a rear vehicle body 2, a front vehicle body 3 that is swingably coupled to the front side of the rear vehicle body 2 in the left-right direction, rear wheels 4 (the left wheel only is shown) that are provided in both sides of the rear vehicle body 2 in the left-right direction, front wheels 5 (the left wheel only is shown) that are provided in both sides of the front vehicle body 3 in the left-right direction, a working mechanism 6 that is tiltably provided on the front side of the front vehicle body 3 thereto, and later-described axle devices 11, 12.

Here, the rear vehicle body 2 is provided with an engine 7 as a drive source, a torque converter 8, a transmission 9, a hydraulic pump (not shown) and the like, which are mounted thereon. The transmission 9 is connected to the rear axle device 11 through a propeller shaft 9A extending in a front-rear direction and is connected to the front axle device 12 through a propeller shaft 9B. A cab 10 in which an operator gets is provided on the upper side of the rear vehicle body 2.

The rear axle device 11 is provided to be positioned on the lower side of the rear vehicle body 2. The rear axle device 11 is formed to extend in the left-right direction, and the rear wheel 4 is mounted to each of the left and right end parts of the rear axle device 11.

On the other hand, the front axle device 12 is provided to be positioned on the lower side of the front vehicle body 3. The front axle device 12 is formed to extend in the left-right direction as similar to the rear axle device 11, and the front wheel 5 is mounted to each of the left and right end parts of the front axle device 12.

Here, the rear axle device 11 and the front axle device 12 are configured approximately in the same way with each other. Therefore, in the first embodiment, an explanation will be in detail made of the configuration of the front axle device 12, and an explanation of the configuration of the rear axle device 11 is to be omitted.

Figure 2:
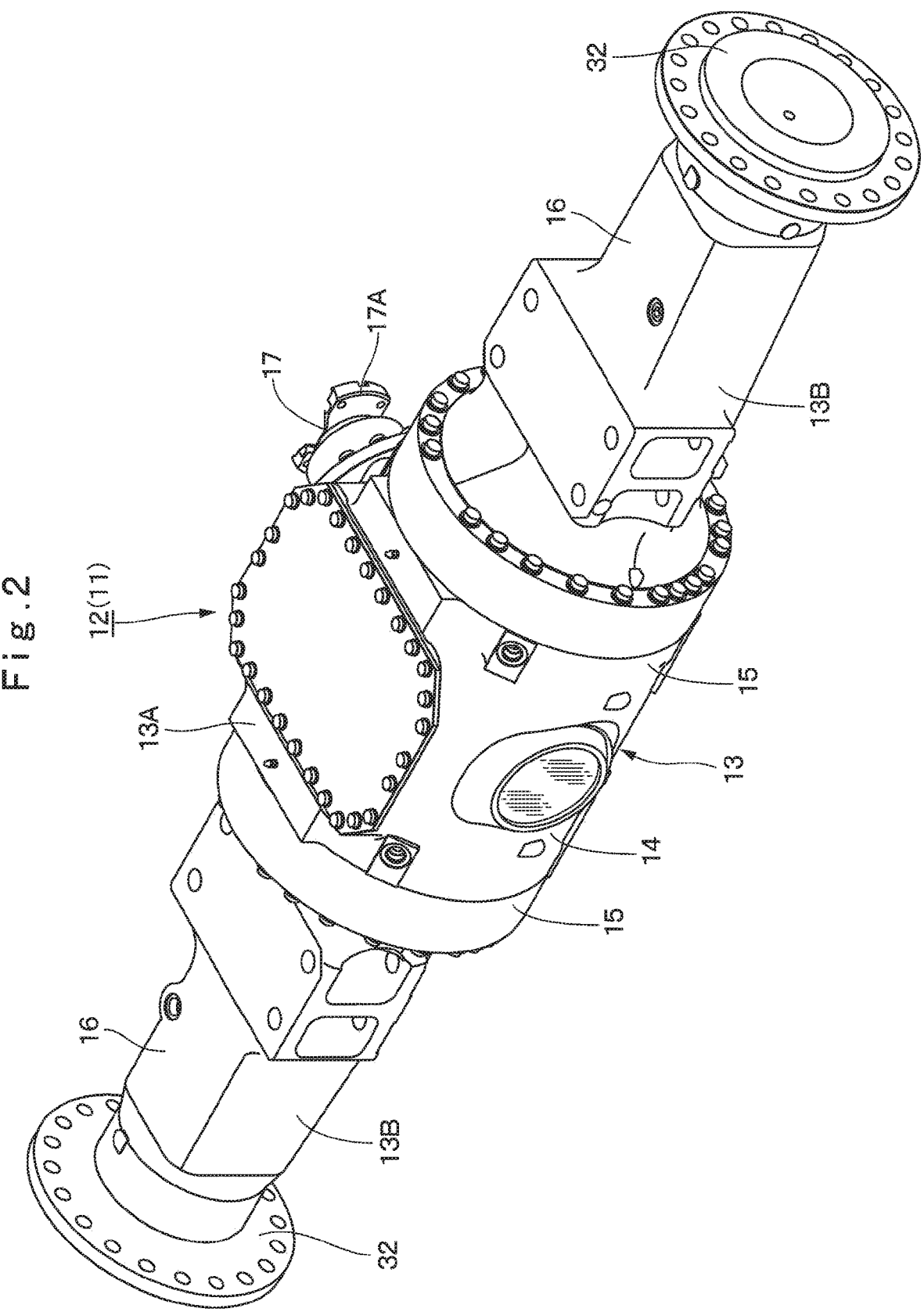
FIG. 2 is an outside appearance perspective view showing a front axle device in FIG. 1 as viewed from forward in an enlarging manner.
Figure 3:
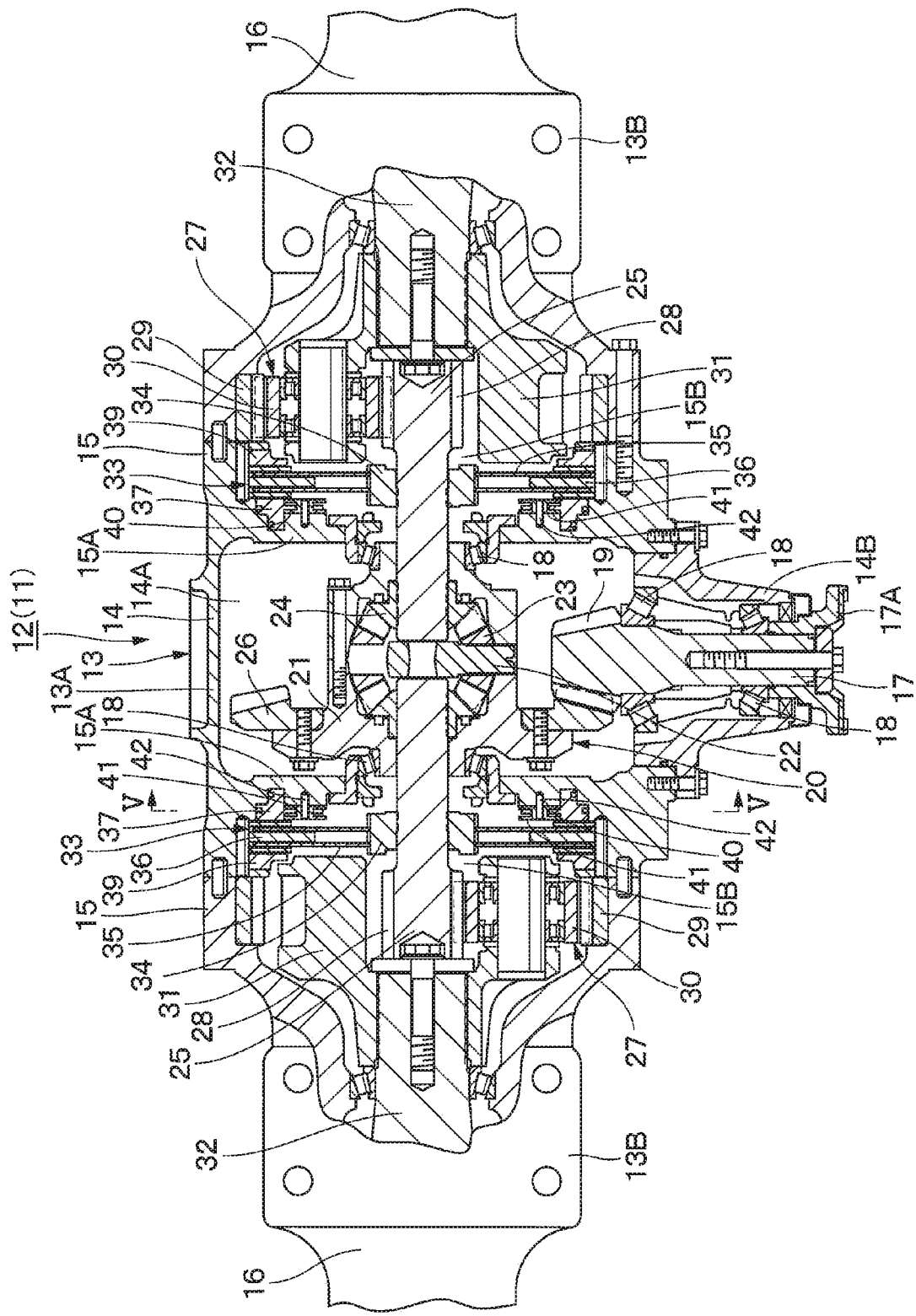
FIG. 3 is across sectional view showing an internal structure of the front axle device.

The front axle device 12 is connected to the propeller shaft 9B to drive/rotate the left and right front wheels 5. The front axle device 12 includes, as shown in FIG. 2 and FIG. 3, a differential case 14, a brake case 15, a differential mechanism 20, a planetary gear reduction mechanism 27, a brake mechanism 33, a projecting part 40, an engaging member 41 and a pin member 42, which will be described later.

A casing 13 configures an outer shell of the front axle device 12. The casing 13 is formed as a closed tubular vessel by a central tubular part 13A positioned in the center in the left-right direction and lateral tubular parts 13B mounted respectively on both sides of the central tubular part 13A in the left and the right, and the inside of the casing 13 is filled with lubricating oil. The casing 13 accommodates members that differ in the left-right direction, and is sectioned into the differential case 14, the left and right brake cases 15 and the left and right axle tubes 16, which will be described later, for the respective functions.

The differential case 14 is arranged in the central part of the casing 13 in the left-right direction. The differential case 14 is arranged in a range between partition walls 15A of the left and right brake cases 15 to be described later, and the inside thereof is formed as a differential mechanism accommodating room 14A that accommodates the differential mechanism 20. Both the left and right sides of the differential mechanism accommodating room 14A are respectively defined by the partition walls 15A of the left and right brake cases 15. A projecting tube 14B is provided on the rear side of the differential case 14 to project to the transmission 9-side, and a later-described input shaft 17 is rotatably arranged in the projecting tube 14B therein.

The brake cases 15 are arranged in both sides of the differential case 14 in the left-right direction. Each of the left and right brake cases 15 is partitioned from the differential mechanism accommodating room 14A in the differential case 14 by the partition wall 15A. The partition wall 15A is formed as an annular plate-shaped body that is reduced in diameter from an inner peripheral surface of the differential case 14, and a later-described rotational shaft 25 is inserted in a central part of the partition wall 15A. Therefore, the inside of each of the brake cases 15 is partitioned by each of the partition walls 15A to be formed as a brake mechanism accommodating room 15B.

Here, each of the partition walls 15A of the brake cases 15 is provided with a stepped, annular piston insertion part 15C positioned on an outer peripheral side, and the piston insertion part 15C opens to the brake mechanism accommodating room 15B-side (the outer side in the left-right direction). In addition, each of the partition walls 15A is provided with an annular mounting surface 15D positioned closer to the inner diameter side than the piston insertion part 15C, and the mounting surface 15D is provided with pin insertion holes 15E (two locations only are shown) positioned in a plurality of locations in the circumferential direction, for example, six locations in the first embodiment.

The later-described pin member 42 is movably inserted in each of the pin insertion holes 15E in the left-right direction as an axial direction. Each of the pin insertion holes 15E has an inner diameter dimension (diameter dimension) set in such a manner as to generate a predetermined frictional resistance to be described later against the inserted pin member 42.

Further, the outer side of each of the brake cases 15 in the left-right direction is formed as the axle tube 16 using the lateral tubular part 13B. The axle tube 16 is formed as a tubular body that is reduced in diameter and extends in the left-right direction. An axle shaft 32 to be described later is rotatably provided in the inside of each of the left and right axle tubes 16, respectively.

The input shaft 17 is rotatably provided in the projecting tube 14B of the differential case 14 by two bearings 18 (refer to FIG. 3). The input shaft 17 has a flange part 17A that projects into an exterior, and the flange part 17A is connected to the propeller shaft 9B. In addition, an end part of the input shaft 17 extending into the differential mechanism accommodating room 14A is provided with a pinion gear 19 composed of a bevel gear.

The differential mechanism 20 is provided in the differential mechanism accommodating room 14A in the differential case 14. The differential mechanism 20 distributes drive forces of the engine 7 as the drive source to the left and right front wheels 5 through the rotational shafts 25 and the axle shafts 32 that are arranged in the left-right direction. In addition, the differential mechanism 20 includes a gear case 21 that is rotatably supported on the respective partition walls 15A of the left and right brake cases 15 as an axial line of the left-right direction through the bearings 18, a plurality of differential pinion gears 23, two side gears 24, and the two rotational shafts 25. Here, each of the differential pinion gears 23 is rotatably provided on a spider 22 fixed in the gear case 21, and each of the side gears 24 is engaged with each of the differential pinion gears 23. Each of the rotational shafts 25 has a base end side that is spline-coupled to the side gear 24 and a tip end side that extend in the left-right direction toward the axle shaft 32.

A differential ring gear 26 to be engaged with the pinion gear 19 of the input shaft 17 is provided on an outer peripheral side of the gear case 21. The differential ring gear 26 is formed of a bevel gear, and configures the differential mechanism 20 together with the gear case 21, the differential pinion gears 23, the side gears 24, the rotational shafts 25 and the like.

A rotational force by the transmission 9 is transmitted to the gear case 21 through the input shaft 17, the pinion gear 19 and the differential ring gear 26. Rotation of the gear case 21 is transmitted to the left and right rotational shafts 25 through the differential pinion gears 23 and the side gears 24. Thereby, the differential mechanism 20 drives/rotates the left and right rotational shafts 25 as needed.

The planetary gear reduction mechanisms 27 are provided respectively in the brake mechanism accommodating rooms 15B in the left and right brake cases 15 together with the later-described brake mechanism 33. The left and right planetary gear reduction mechanisms 27 reduce rotations of the rotational shafts 25, which are transmitted to the axle shafts 32. In addition, each of the left and right planetary gear reduction mechanisms 27 includes a sun gear 28 formed integrally with a tip end side of the rotational shaft 25, a ring gear 29 provided to be fixed on an inner peripheral side of the axle tube 16, a plurality of planet gears 30 to be engaged with the sun gear 28 and the ring gear 29, and a carrier 31 that rotatably supports each of the planet gears 30.

The axle shafts 32 are arranged within the left and right axle tubes 16 respectively to extend in the length direction (axial direction) therein. Each of the axle shafts 32 transmits the rotation of each of the left and right rotational shafts 25 to each of the left and right front wheels 5. Each of the axle shafts 32 is spline-coupled on the base end side to the carrier 31 of the planetary gear reduction mechanism 27, and extends in the left-right direction within each of the axle tubes 16. On the other hand, the tip end side of each of the axle shafts 32 projects from the axle tube 16, and each of the left and right front wheels 5 is mounted on an end part of each of the axle shafts 32.

Next, an explanation will be in detail made of the configuration of the left and right brake mechanisms 33 that is the characteristic part of the present invention.

The left and right brake mechanisms 33 are provided in the brake mechanism accommodating rooms 15B in the left and right brake cases 15, respectively. Each of the brake mechanisms 33 applies braking to the rotation of the rotational shaft 25 in the differential mechanism 20, and is configured as a wet type multiple-disc brake mechanism, for example.

Figure 4:
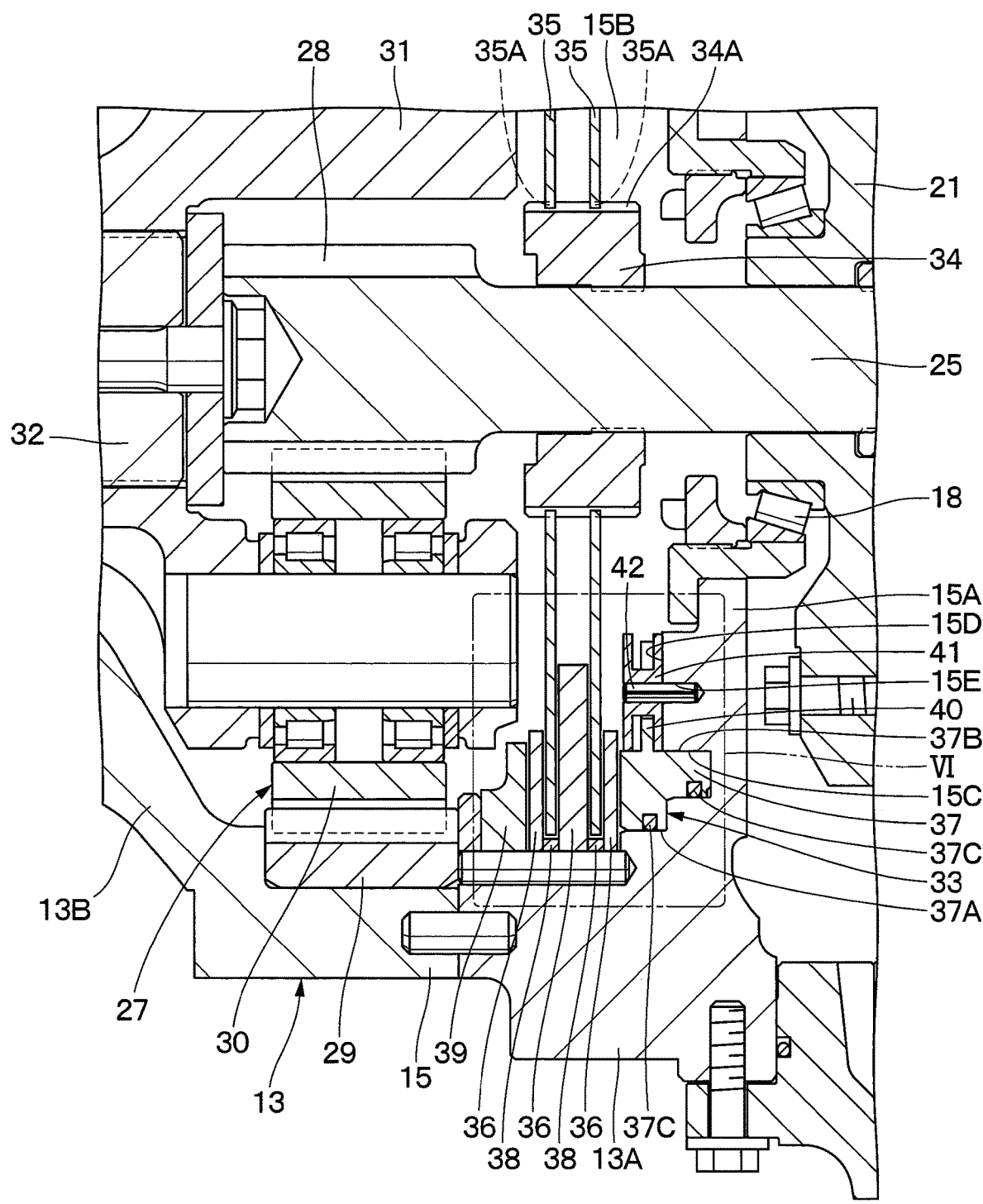
FIG. 4 is an enlarged cross sectional view showing an essential part of a brake mechanism, a planetary gear reduction mechanism and the like in FIG. 3.
Figure 5:
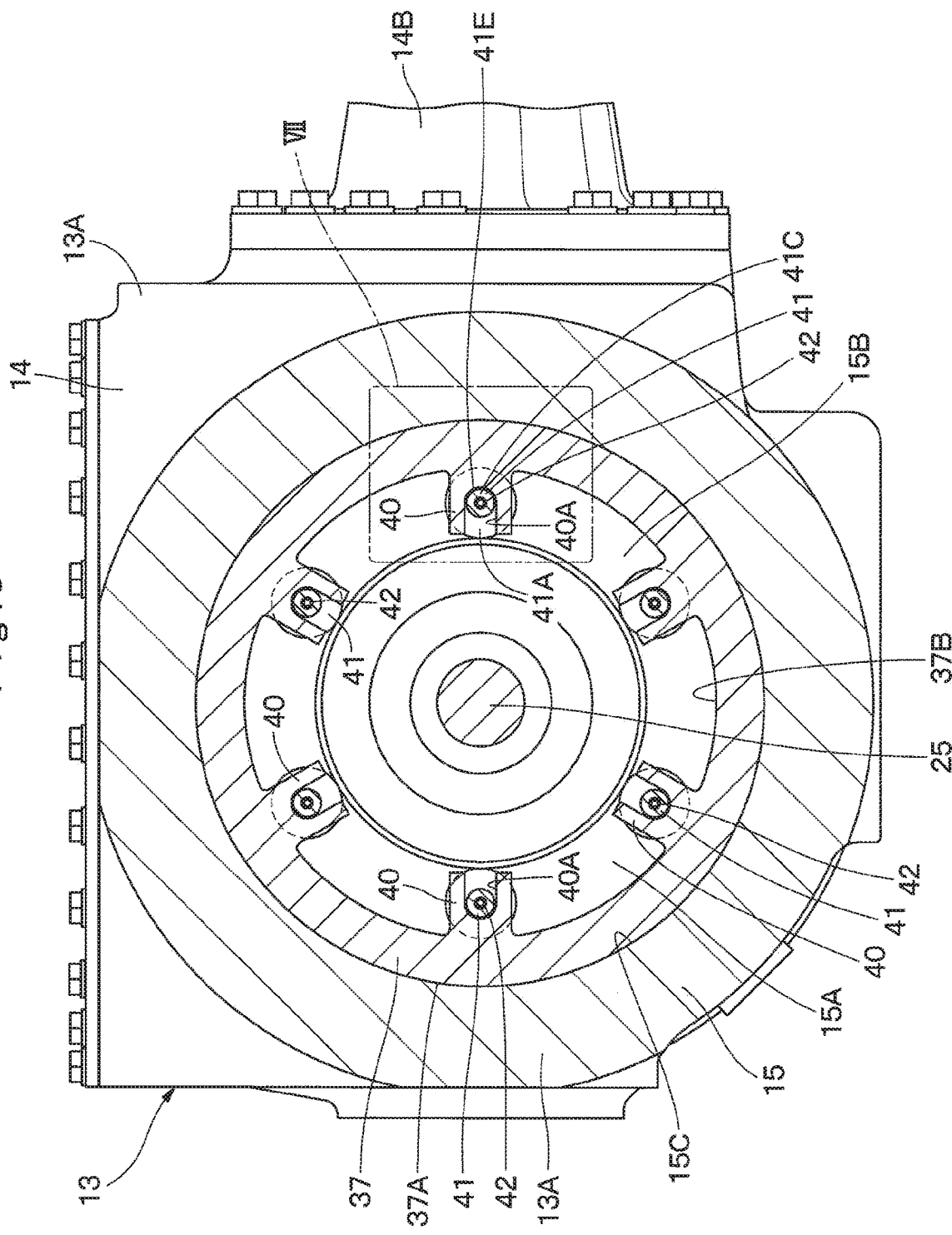
FIG. 5 is a cross sectional view as viewed in a direction of arrows V-V in FIG. 3.

The brake mechanism 33 includes, as shown in FIG. 4, a cylindrical hub 34 spline-coupled on an outer peripheral side of the rotational shaft 25, a plurality of (for example, two) rotating discs 35, a plurality of (for example, three) non-rotating discs 36, a piston 37 and elastic members 38. The plurality of rotating discs 35 are mounted on the outer peripheral side of the rotational shaft 25 through the hub 34, and rotates together with the rotational shaft 25 with the spline-coupling to the hub 34. The plurality of non-rotating discs 36 are non-rotatably (in a non-rotating state) mounted on the brake case 15 (central tubular part 13A of the casing 13) in such a manner as to face and be across each of the rotating discs 35. The piston 37 is provided in the piston insertion part 15C of the brake case 15, and presses the non-rotating discs 36 on the rotating discs 35 by hydraulic forces from an exterior. The elastic member 38 is positioned between the non-rotating discs 36 and is arranged on the radial outside of each of the non-rotating discs 36 to apply to each of the non-rotating discs 36 a elastic force (urging force) in a direction of being away from each other.

Each of the brake mechanisms 33 depresses a brake pedal (not shown) with a foot, for example, to move the piston 37 in an axial direction by pressurized oil supplied to a later-described oil chamber 37D and press the non-rotating disc 36 on the rotating disc 35. As a result, a frictional force between the rotating disc 35 and the non-rotating disc 36 generates a braking force to apply braking to the front wheel 5.

Figure 6:
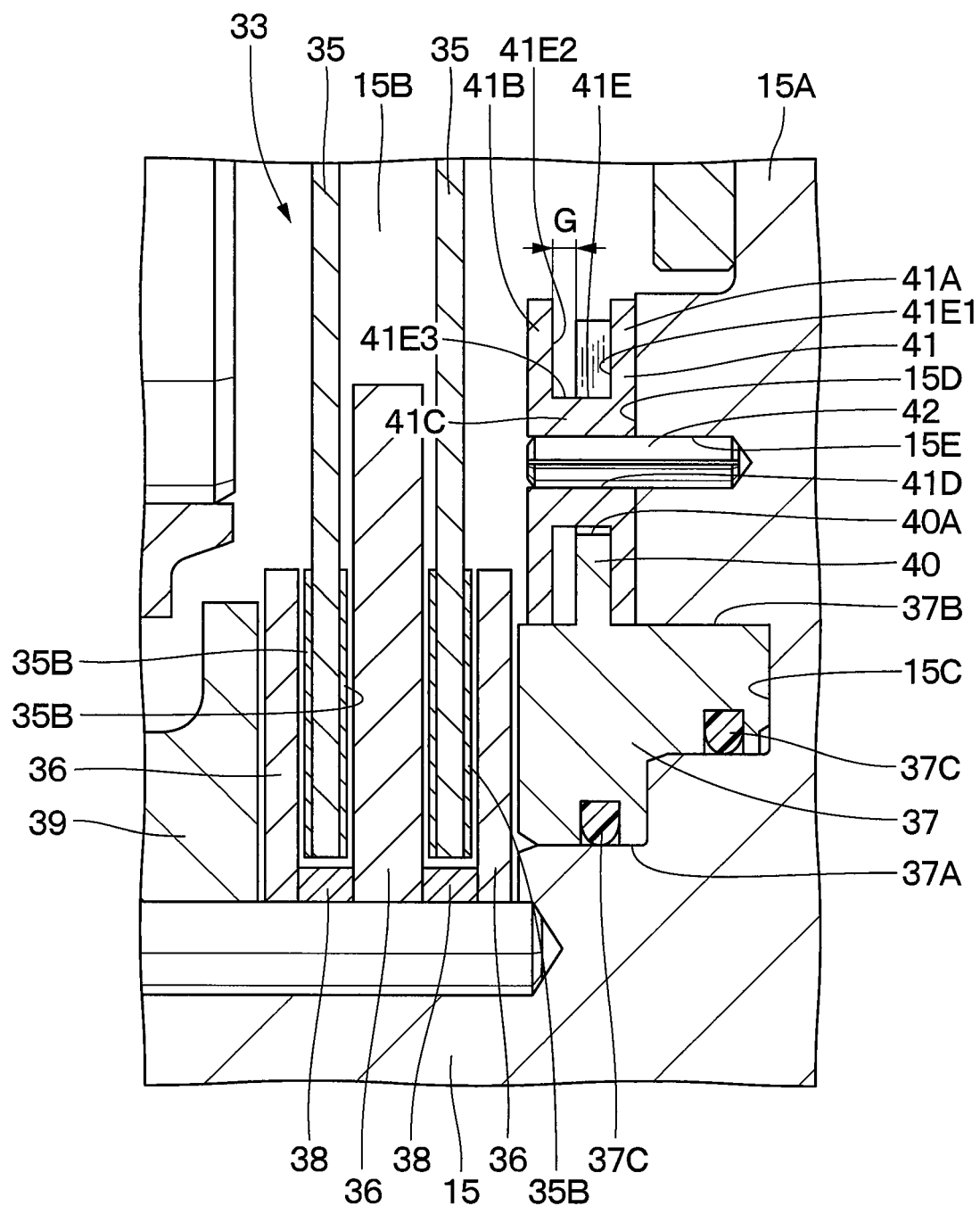
FIG. 6 is an enlarged cross sectional view showing a VI part in FIG. 4.
Figure 7:
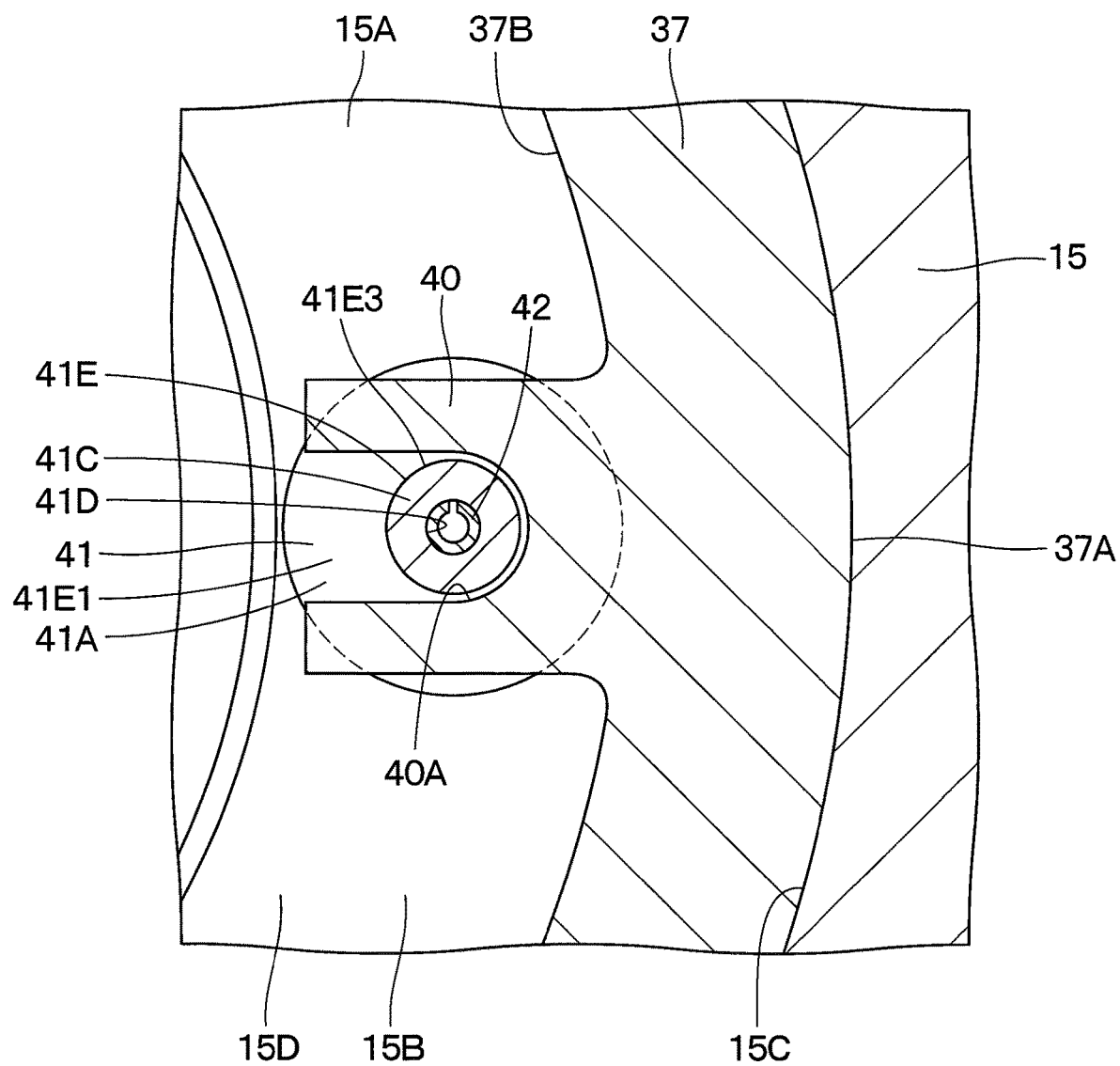
FIG. 7 is an enlarged cross sectional view showing a VII part in FIG. 5.

Here, the rotating discs 35 each are formed of an annular plate body, and are arranged on the outer peripheral side of the rotational shaft 25 in a state of being alternately neighbored to the non-rotating discs 36 in the axial direction. An inner peripheral side of the rotating disc 35 is formed as a female spline 35A, and the female spline 35A is spline-coupled to a male spline 34A of the hub 34 mounted on the rotational shaft 25. Thereby, the rotating disc 35 can rotate together with the rotational shaft 25 in a state of being axially movable to the hub 34. As shown in FIG. 6, frictional materials 35B are provided on both surfaces of the rotating disc 35 in the left-right direction to be positioned closer to the radial outer side.

The non-rotating disc 36 is formed of an annular plate body as a whole, and comprises three discs in such a manner as to face and be across each of the two rotating discs 35 in the left-right direction. The non-rotating disc 36 is mounted in a state where an outer peripheral edge thereof is movable to an inner peripheral surface side of the brake case 15 in the left-right direction and is non-movable to the brake case 15.

The piston 37 has an outer peripheral surface 37A that is formed as a stepped cylindrical surface and an inner peripheral surface 37B that is formed an approximately linear, cylindrical surface. The piston 37 is movably inserted in the piston insertion part 15C provided in the brake mechanism accommodating room 15B in the brake case 15 in the left-right direction. The piston 37 presses the non-rotating disc 36 on the rotating disc 35 for frictional contact therebetween to apply a braking force to the rotational shaft 25.

Here, the outer peripheral surface 37A of the piston 37 is provided with two seal members 37C axially spaced from each other and over an entire circumference. The annular oil chamber 37D (refer to FIG. 8 and like) is formed between the outer peripheral surface 37A of the piston 37 and the piston insertion part 15C by the respective seal members 37C. Further, the inner peripheral surface 37B of the piston 37 is provided thereon with the later-described plurality of projecting parts 40 spaced from each other in the circumferential direction.

Figure 10:
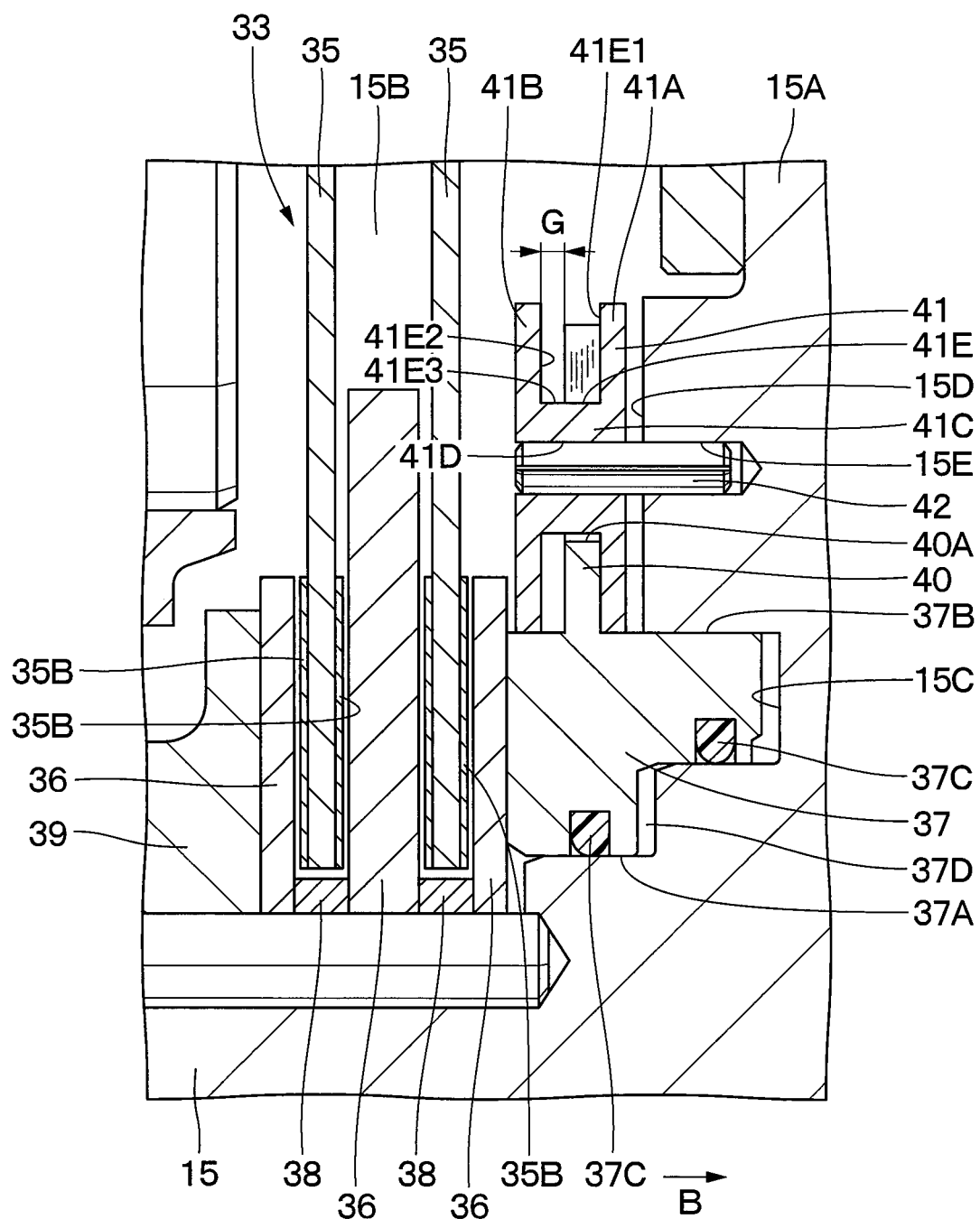
FIG. 10 is a cross sectional view showing a state where the braking by the piston is released and the piston is moved back by an elastic material until the projecting part of the piston abuts on the engaging member, as viewed in a position as similar to that of FIG. 6.

The elastic member 38 is positioned closer to the outer diameter side than the rotating disc 35 and is provided between the neighbored non-rotating discs 36. The elastic member 38 is formed of, for example, a disc spring, a wave washer or the like, and applies an elastic force to the non-rotating discs 36 neighbored thereto in a direction of being away from each other. As a result, as shown in FIG. 6 and FIG. 10, at the non-braking, a clearance is formed between each of the non-rotating discs 36 and each of the rotating discs 35 by the elastic force of the elastic member 38, and the piston 37 is pushed back by a prescribed dimension G to be described later.

An end plate 39 is arranged at the opposite to the piston 37 across the respective discs 35, 36. The end plate 39 is formed as an annular reinforcement member, and abuts on an end surface of the ring gear 29. Therefore, the endplate 39 holds tightly the rotating discs 35 and the non-rotating discs 36 with the piston 37 therebetween and can receive a pressing force of the piston 37 at this time.

Next, an explanation will be made of the configuration of returning back the piston 37 by a prescribed dimension at the time of releasing the pressing force of the piston 37 having pressed the respective discs 35, 36. The configuration of returning back the piston 37 by the prescribed dimension includes the aforementioned elastic member 38, and the projecting part 40, the engaging member 41 and the pin member 42, which will be described later.

The projecting part 40 is provided to project radially inward from the inner peripheral surface 37B as an inner diameter side of the piston 37 to face the partition wall 15A of the brake case 15. The projecting part 40 comprises a plurality of, for example, six projecting parts that are provided by equal intervals in the circumferential direction of the piston 37, for example (refer to FIG. 5).

Each of the projecting parts 40 extends toward the radial inner side, and a tip end side of the projecting part 40 is formed to be forked angularly. Therefore, an engaging member insertion groove 40A in a notched shape (U-letter shape) is formed in each of the projecting parts 40, and the engaging member insertion groove 40A has an opening end at the radial inner side. The engaging member insertion groove 40A is provided for insertion of the engaging member 41 as described later, and the engaging member 41 is inserted therein in the left-right direction. That is, the engaging member insertion groove 40A configures an engaging member insertion part according to the present invention. A central part 41C of the engaging member 41 is inserted in the engaging member insertion groove 40A in the left-right direction. The engaging member 41 can be caused to be easily engaged with the angular engaging member insertion groove 40A from the inner diameter side.

The engaging member 41 is arranged in the inner diameter side of the piston 37 to correspond to each of the projecting parts 40. Each of the engaging members 41 is engaged with the projecting part 40 to be movable by a predetermined dimension in the left-right direction. The engaging member 41 is formed in a bobbin shape by a side plate part 41A in a disc shape that is arranged in the partition wall 15A-side of the brake case 15, a side plate part 41B in a disc shape that faces the side plate part 41A by an interval and a central part 41C in a columnar shape that is positioned between the side plate parts 41A, 41B and is smaller in diameter than the side plate parts 41A, 41B. A pin insertion hole 41D is formed in a shaft center part of the side plate parts 41A, 41B and the central part 41C to axially penetrate. The engaging member 41 in the bobbin shape is provided with an entirely circumferential engaging groove 41E in a recessed groove shape formed to open over an entire circumference on the outer diameter side.

The entirely circumferential engaging groove 41E of the engaging member 41 is provided with a side wall surface 41E1 in the side plate part 41A-side, a side wall surface 41E2 in the side plate part 41B-side and a bottom surface 41E3 as an outer peripheral surface of the central part 41C, and accordingly, the entirely circumferential engaging groove 41E forms an entirely circumferential recessed groove. As shown in FIG. 6, a groove width dimension of the entirely circumferential engaging groove 41E, that is, a dimension between the side wall surfaces 41E1, 41E2 is set to a value greater by a dimension G than the plate thickness dimension of the projecting part 40. Thereby, the projecting part 40 (piston 37) can move by the dimension G to the engaging member 41. In this case, the dimension G is a clearance for allowing the piston to return back to the partition wall 15A-side of the brake case 15 due to releasing the braking of the piston 37. Accordingly, the dimension G is set to an appropriate dimension in which, in a state where the piston 37 releases the braking, the contact between the respective discs 35, 36 can be prevented and, at the next braking, the piston 37 can press the respective discs 35, 36 instantly.

The pin member 42 movably supports the engaging member 41 in the left-right direction to the partition wall 15A of the brake case 15. The pin member 42 is provided to extend in the left-right direction between the partition wall 15A of the brake case 15 and the engaging member 41. The pin member 42 is formed of a spring pin having an elastic force in a radial direction, and is inserted in the pin insertion hole 15E of the partition wall 15A and the pin insertion hole 41D of the engaging member 41 to be elastically deformed thereto. That is, frictional resistances are applied respectively between the pin member 42 and the pin insertion hole 15E of the partition wall 15A and between the pin member 42 and the pin insertion hole 41D of the engaging member 41.

Here, descriptions will be made of a relation in magnitude between an elastic force (pressing force) and a frictional force (frictional resistance) set to each of the components for returning the piston 37 back to an appropriate position at the non-braking.

First, a pushing force (pressing force) of the piston 37 by a hydraulic pressure supplied to the oil chamber 37D is set the greatest value. At least one frictional resistance of the frictional resistance between the pin member 42 and the partition wall 15A (pin insertion hole 15E) of the brake case 15 and the frictional resistance between the pin member 42 and the pin insertion hole 41D of the engaging member 41 is set to a value smaller than a pressing force of the piston 37 at the braking. In the first embodiment, the frictional resistance between the pin member 42 and the pin insertion hole 15E of the brake case 15 is set to a value smaller than the pressing force of the piston 37 at the braking. In addition, the frictional resistance between the pin member 42 and the pin insertion hole 41D of the engaging member 41 is set to a value greater than the frictional resistance between the pin member 42 and the pin insertion hole 15E of the brake case 15.

It should be noted that the frictional resistance between the pin member 42 and the pin insertion hole 41D of the engaging member 41 may be set to a value smaller than the pressing force of the piston 37 at the braking. Further, the frictional resistance between the pin member 42 and the pin insertion hole 15E and the frictional resistance between the pin member 42 and the pin insertion hole 41D each may be set to a value smaller than the pressing force of the piston 37 at the braking.

Further, the frictional resistance between the pin member 42 and the pin insertion hole 15E of the brake case 15 and the frictional resistance between the pin member 42 and the pin insertion hole 41D of the engaging member 41 each are set to a value greater than the elastic force (pressing force) of the elastic member 38. Moreover, the elastic force by the elastic member 38 is set to a value greater than a frictional resistance at the of moving the piston 37 at the non-braking, that is, a frictional resistance between the piston insertion part 15C of the brake case 15 and each of the seal members 37C of the piston 37.

Here, an explanation will be made of an example relating to a work of assembling the engaging member 41 and the pin member 42 to the partition wall 15A of the brake case 15. First, the piston 37 is inserted in the piston insertion part 15C of the brake case 15. In this state, the engaging member 41 is mounted to the projecting part 40 from the inner diameter side to cause the entirely circumferential engaging groove 41E to be engaged with the engaging member insertion groove 40A of the projecting part 40. When the engaging member 41 is mounted to the projecting part 40, the pin member 42 is inserted/fitted (press-fitted) into and throughout the pin insertion hole 41D of the engaging member 41 and the pin insertion hole 15E of the brake case 15. In this way, the engaging member 41 and the pin member 42 can be assembled in a simple work without using a specific tool and the like.

Next, an explanation will be made of the movement by the brake mechanism 33 at the braking based upon a force relationship of the pressing force and the frictional force of each of the components as described before, and the like with reference to FIG. 6 to FIG. 12.

Descriptions will be made of an example relating to a state immediately after the brake mechanism 33 is assembled (in a state where a brake pedal is not depressed once). For example, as shown in FIG. 6, the side plate part 41A of the engaging member 41 is in close proximity to the mounting surface 15D (partition wall 15A) of the brake case 15, and the projecting part 40 provided in the piston 37 is in close proximity to the side wall surface 41E1 of the entirely circumferential engaging groove 41E. In addition, the respective non-rotating discs 36 are away from each other by a clearance equal to or more than that ensured by the elastic member 38.

Figure 8:
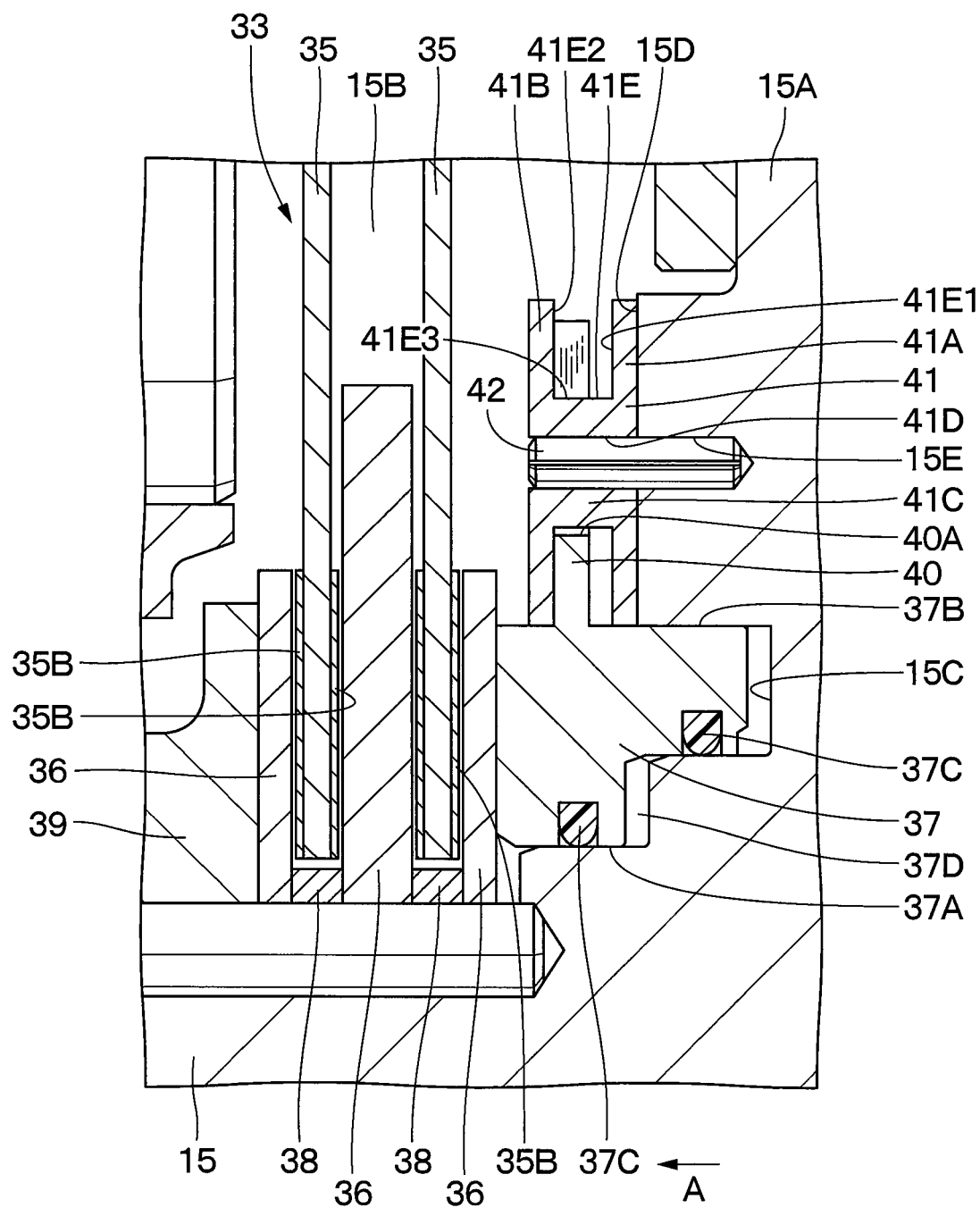
FIG. 8 is across sectional view showing a state where a piston is moved until a projecting part of the piston abuts on an engaging member, as viewed in a position as similar to that of FIG. 6.

When the brake pedal is depressed by an operator, as shown in FIG. 8, the pressurized oil is supplied to the oil chamber 37D to move the piston 37 in a direction of arrow A. At this time, since the pushing force (pressing force) of the piston 37 by the hydraulic pressure is set to a value remarkably greater than the frictional resistance between the piston 37 and each of the seal members 37C, the piston 37 can move smoothly.

Figure 9:
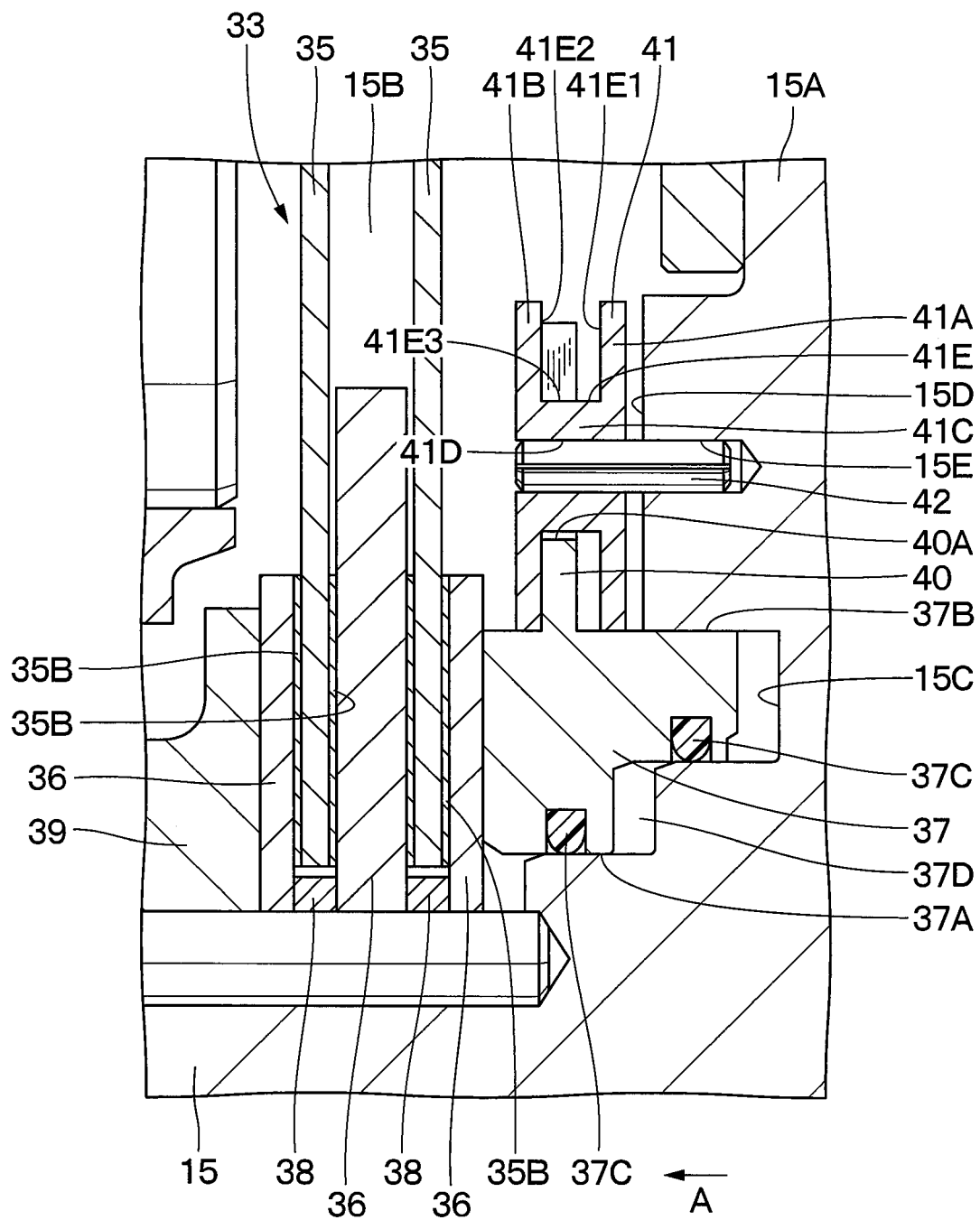
FIG. 9 is a cross sectional view showing a state where the piston presses each of discs for braking, as viewed in a position as similar to that of FIG. 6.

Subsequently, when the brake pedal is further depressed, as shown in FIG. 9 the piston 37 abuts on the non-rotating disc 36 to press the respective discs 35, 36. Accordingly, since the frictional force between the frictional material 35B of each of the rotating discs 35 and each of the non-rotating discs 36 increases, this frictional resistance can generate the braking force against the rotational shaft 25. In this case, the pushing force (pressing force) of the piston 37 by the hydraulic pressure is set to a value greater than the pressing force in the opposing direction by the elastic forces of the respective elastic members 38. Accordingly, the piston 37 can strongly press each of the discs 35, 36 against each of the elastic members 38.

in addition, in a case where the brake pedal is largely depressed, each of the projecting parts 40 provided in the piston 37 abuts on the side wall surface 41E2 (side plate part 41B) of the entirely circumferential engaging groove 41E in the engaging member 41 to press the engaging member 41 in a direction of arrow A. At this time, the frictional resistance between the pin member 42 and the partition wall 15A (pin insertion hole 15E) of the brake case 15 is set to a value smaller than the pressing force of the piston 37 at the braking. Accordingly, the engaging member 41 and the pin member 42 move together in a direction of arrow A until a movement limit position (brake position) of the piston 37.

Next, in a case where a foot is released from the brake pedal to release the braking by the brake mechanism 33, the elastic force by the elastic member 38 is set to a value greater than a frictional resistance at the time of moving the piston 37 at the non-braking, that is, a frictional resistance between the piston insertion part 15C of the brake case 15 and each of the seal members 37C of the piston 37. Therefore, as shown in FIG. 10, the piston 37 moves in a direction of arrow B by the elastic force of the elastic member 38.

In addition, when the piston 37 moves until a clearance between the non-rotating discs 36 becomes proper by each of the elastic members 38, each of the projecting parts 40 provided in the piston 37 abuts on the side wall surface 41E1 (side plate part 41A) of the entirely circumferential engaging groove 41E in the engaging member 41. In this case, the frictional resistance between the pin member 42 and the partition wall 15A (pin insertion hole 15E) of the brake case 15 is set to a value greater than the elastic force of the elastic member 38. Accordingly, the movement of the piston 37 is stopped in a position where the projecting part 40 abuts on the side plate part 41A of the engaging member 41, that is, in a position where the piston 37 is retuned back by the dimension G in a direction of arrow B. Therefore, since the piston 37 is retuned back by the dimension G for each time at the brake releasing, the piston 37 in the non-braking state can be arranged in a position where contact between the respective discs 35, 36 is prevented and at the next braking, a proper brake operation can be performed instantly.

Next, an explanation will be made of the movement of the piston 37 in a case where the frictional material 35B of each of the rotating discs 35 is worn.

Figure 11:
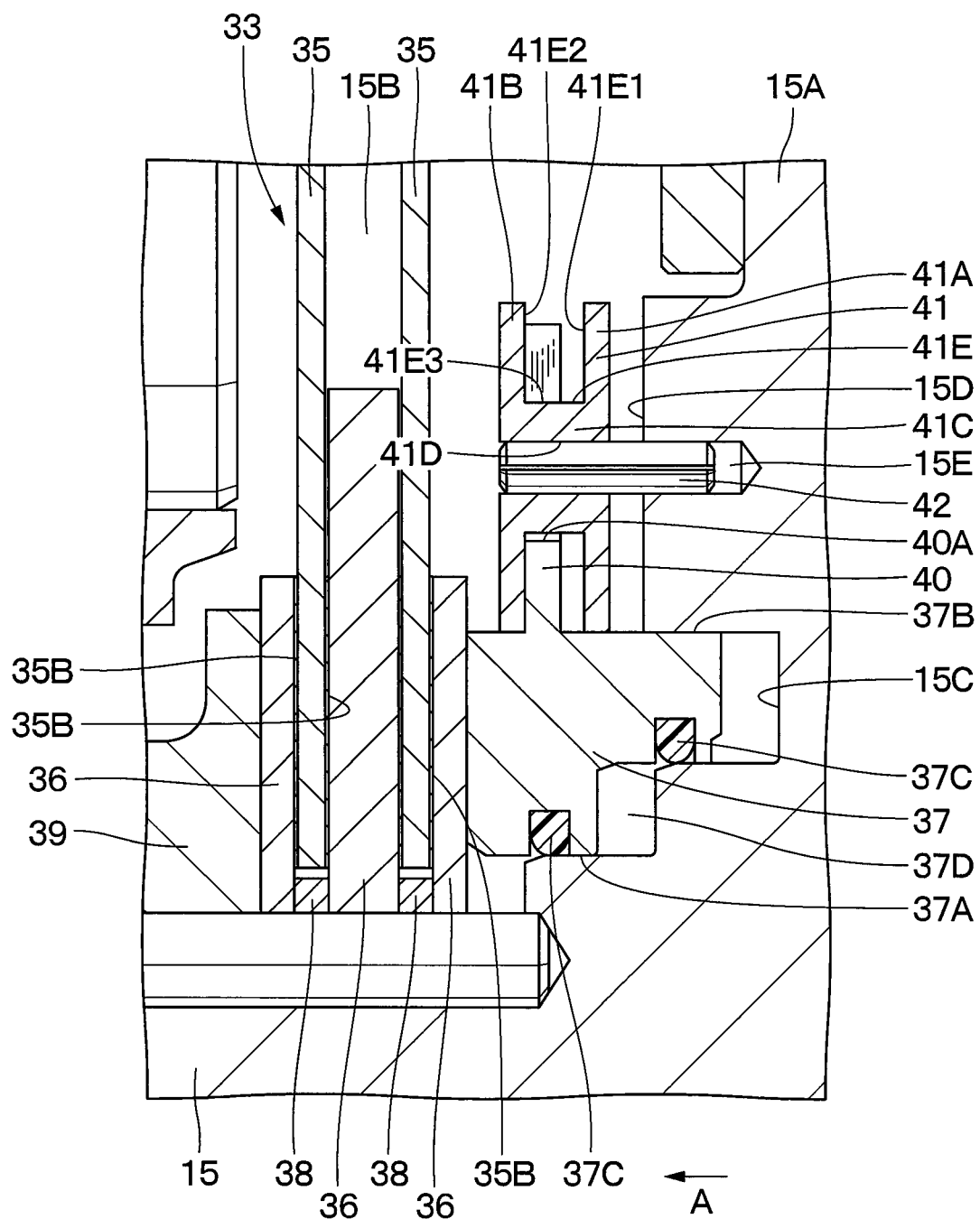
FIG. 11 is a cross sectional view showing a state where the braking is applied to worn rotating discs, as viewed in a position as similar to that of FIG. 6.

In this case, as shown in FIG. 11, as similar to when each of the aforementioned rotating discs 35 is in a regular state, the piston 37 presses the respective non-rotating discs 36 on the respective rotating discs 35, making it possible to generate a braking force to the rotational shaft 25. At this time, a movement amount of the piston 37 increases corresponding to a wear volume of the frictional material 35B of each of the rotating discs 35, which causes the engaging member 41 and the pin member 42 to further move together with the piston 37 in the direction of arrow A.

Figure 12:
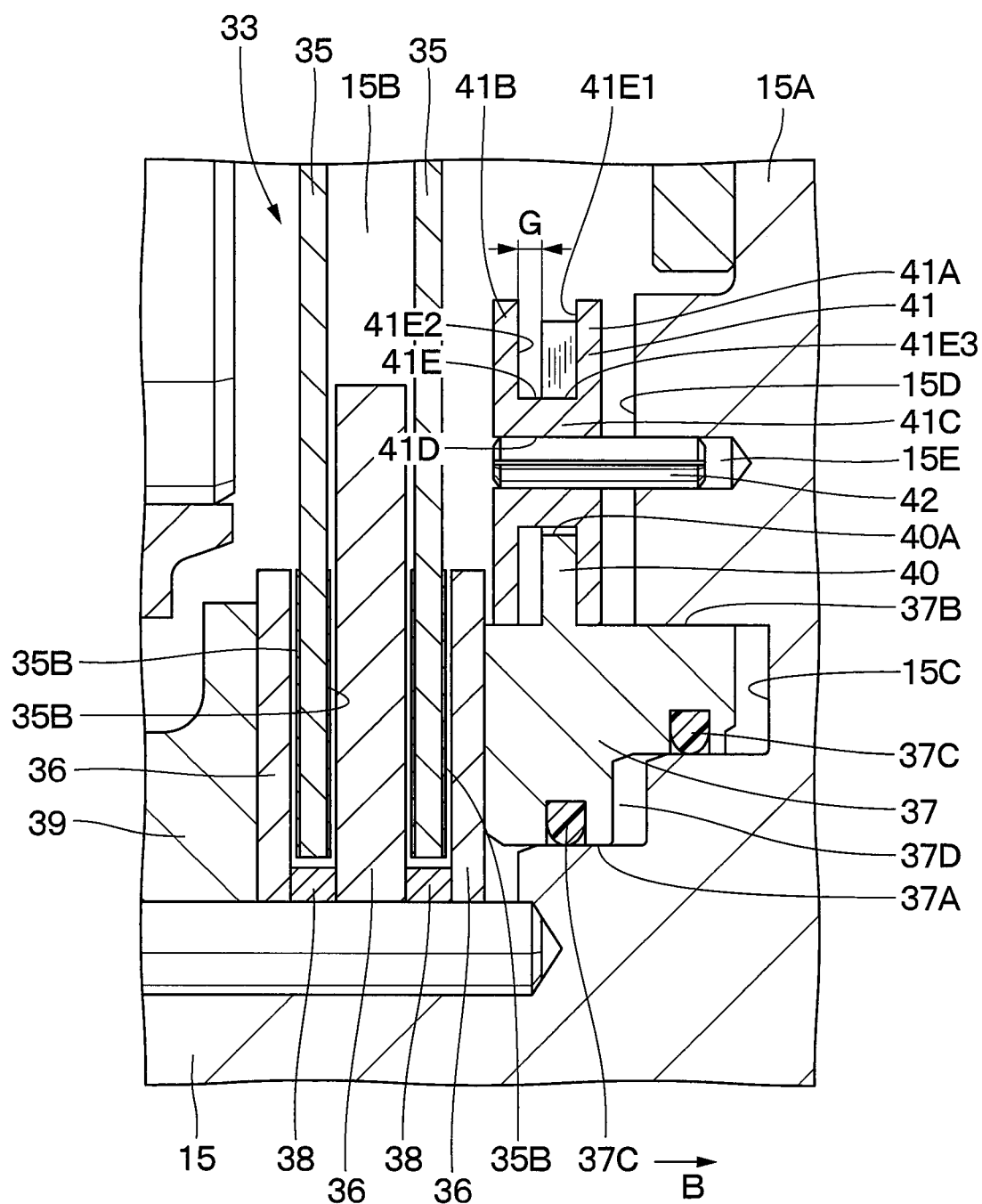
FIG. 12 is a cross sectional view showing a state where the braking applied to the worn rotating discs is released and the piston is moved back by the elastic member until the projecting part of the piston abuts on the engaging member, as viewed in a position as similar to that of FIG. 6.

On the other hand, in a case where the braking by the brake mechanism 33 is released, as shown in FIG. 12, the piston 37 moves in the direction of arrow B with the elastic force by the elastic member 38. In addition, the piston 37 is returned back by the dimension G by which the projecting part 40 abuts on the side plate part 41A of the engaging member 41 to be stopped. In this way, even in a case where the frictional material 35B of each of the rotating discs 35 is worn, when the braking is released, it is possible to return back the piston 37 by the dimension G for each time.

The wheel loader 1 according to the present embodiment has the configuration as described above, and next, an explanation will be made of the movement of the wheel loader 1.

First, an operator who gets in the cab 10 controls levers, pedals and the like (any of them is not shown) to operate the transmission 9 for travel. At this time, a rotational force of the output shaft in the transmission 9 is transmitted to the left and right axle shafts 32 through the input shaft 17 in the front axle device 12, the differential mechanism 20 and the planetary gear reduction mechanism 27 from the propeller shaft 9B. Accordingly, it is possible to drive/rotate the left and right front wheels 5 connected to the respective axle shafts 32. Similarly, it is possible to drive/rotate the left and right rear wheels 4 by transmitting rotation of the output shaft in the transmission 9 to the rear axle device 11 from the propeller shaft 9A.

In this way, when the front and rear wheels 5, 4 are driven/rotated, it is possible to cause the wheel loader 1 to travel toward a working site. In a case where the wheel loader 1 turns to any of the left and right directions at the traveling, each of the differential pinion gears 23 in the differential mechanism 20 makes an axial rotation and transmits a rotational force to each of the side gears 24. Therefore, for example, when the wheel loader 1 turns to the left, a rotating speed of each of the left wheels 5, 4 in the inner wheel side can be made lower than a rotating speed of each of the right wheels 5, 4 in the outer wheel side. Accordingly, the wheel loader 1 can smoothly turn because of a difference in rotating speed between the inner wheel 5 and the outer wheel 4.

In addition, at the traveling of the wheel loader 1, when the brake pedal (not shown) is operated, the brake mechanism 33 generates a braking force to the rotational shaft 25, thus making it possible to decelerate or stop the wheel loader 1. When the braking is released, the brake mechanism 33 can return back the piston 37 by the dimension G in the direction of arrow B. Accordingly, the piston 37 at the non-braking state can be arranged in a position where the contact between the respective discs 35, 36 can be prevented and at the next braking, an appropriate brake control can be performed instantly.

In this way, according to the present embodiment, each of the left and right brake mechanisms 33 for applying the braking to the rotation of each of the rotational shafts 25 in the differential mechanism 20 includes the projecting part 40 that is provided to project to the radial inward from the inner diameter side of the piston 37 to face the partition wall 15A of the brake case 15, the engaging member 41 that is arranged in the inner diameter side of the piston 37 in a state of being movably engaged with the projecting part 40 by the predetermined dimension in the left-right direction to the projecting part 40 and the pin member 42 that is provided between the partition wall 15A and the engaging member 41 for movably supporting the engaging member 41 in the left-right direction to the partition wall 15A of the brake case 15.

Accordingly, the brake mechanism 33 can be formed by a few kinds of components. In addition, the engaging member 41 can be easily assembled without using a special assembling tool and the like only by causing the entirely circumferential engaging groove 41E to be engaged with each of the projecting parts 40 of the piston 37 and by inserting the engaging member 41 in the partition wall 15A (pin insertion hole 15E) of the brake case 15 using the pin member 42.

As a result, it is possible to cut down on the kind of components and the number of components, and besides, shapes of the engaging member 41, the pin member 42 and the like can be simplified. Accordingly, the assembling workability on the brake mechanism 33 can be improved.

The frictional resistance between the pin member 42 and the partition wall 15A (pin insertion hole 15E) of the brake case 15 out of the frictional resistance between the pin member 42 and the partition wall 15A (pin insertion hole 15E) of the brake case 15 and the frictional resistance between the pin member 42 and the engaging member 41 is set to a value smaller than the pressing force of the piston 37 at the braking. Accordingly, at the time the piston 37 is moved in the direction of arrow A to be pressed against each of the discs 35, 36 for applying the braking to the rotation of the rotational shaft 25, it is possible to move the engaging member 41 and the pin member 42 together with the piston 37.

The elastic member 38 is provided between the respective non-rotating discs 36 to apply the elastic force in a direction in which the respective non-rotating discs 36 are away from each other. Based upon this, the frictional resistance between the pin member 42 and the partition wall 15A of the brake case 15 and the frictional resistance between the pin member 42 and the engaging member 41 each are set to a value greater than the elastic force of the elastic member 38. Accordingly, when the braking is released, a distance of the piston 37 when the piston 37 moves in the direction of arrow B by the elastic member 38 can be defined in a position where the projecting part 40 abuts on the side plate part 41A of the engaging member 41, that is, by the dimension G by which the piston 37 is retuned back in the direction of arrow B. Therefore, the piston 37 results in being returned back by the dimension G for each time at the releasing time of the braking. As a result, the piston 37 can be arranged in a position where the contact between the respective discs 35, 36 can be prevented and at the next braking time, an appropriate brake control can be performed instantly, enhancing reliability to the brake mechanism 33.

In addition, since each of the elastic members 38 applies the elastic force in the direction of separating the respective non-rotating discs 36 from each other, the rotating disc 35 can be sufficiently separated from the non-rotating disc 36, thus reducing loss torque or heating due to sliding contact (drag) of them.

The projecting part 40 of the piston 37 configuring the brake mechanism 33 is provided with the engaging member insertion groove 40A in the notched shape as the engaging member insertion part in which the engaging member 41 is movably inserted in the left-right direction. In addition, the engaging member 41 is provided with the entirely circumferential engaging groove 41E that is movably engaged with the projecting part 40 in the left-right direction. Accordingly, the engaging member 41 causes the entirely circumferential engaging groove 41E to be engaged with the engaging member insertion groove 40A of the projecting part 40 to be mounted to the projecting part 40 from the inner diameter side. In this state, the pin member 42 is inserted (press-fitted) in and throughout the pin insertion hole 41D of the engaging member 41 and the pin insertion hole 15E of the brake case 15. Therefore, the engaging member 41 and the pin member 42 can be assembled in a simple work without using a specific tool and the like.

Further, at the non-braking, the projecting part 40 of the piston 37 abuts on the side wall surface 41E1 of the entirely circumferential engaging groove 41E in the engaging member 41, thus making it possible to keep the dimension by which the piston 37 is returned back by the elastic member 38 to be constant. Accordingly, since it is possible to cause the projecting part 40 to abut on the side wall surface 41E1 of the entirely circumferential engaging groove 41E with a wide area (surface-to-surface contact), contact stress at the collision can be dispersed, therefore preventing wear, deformation and the like of this abutting part. Accordingly, the dimension by which the piston 37 is returned back can be kept to be constant over a long period of time, and besides, it is possible to improve the durability.

Figure 13:
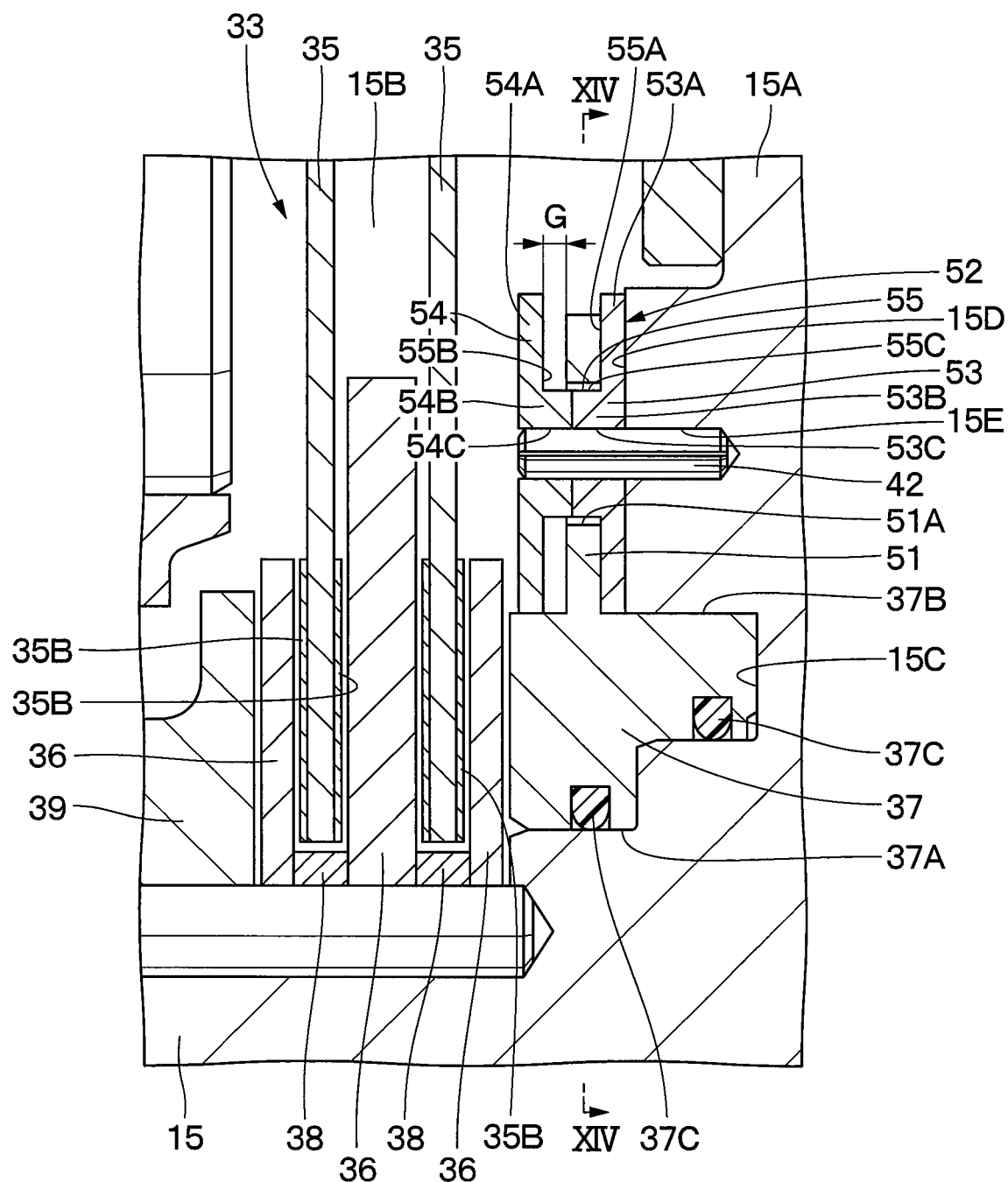
FIG. 13 is a cross sectional view showing a piston and an engaging member according to a second embodiment of the present invention, as viewed in a position as similar to that of FIG. 6.
Figure 14:
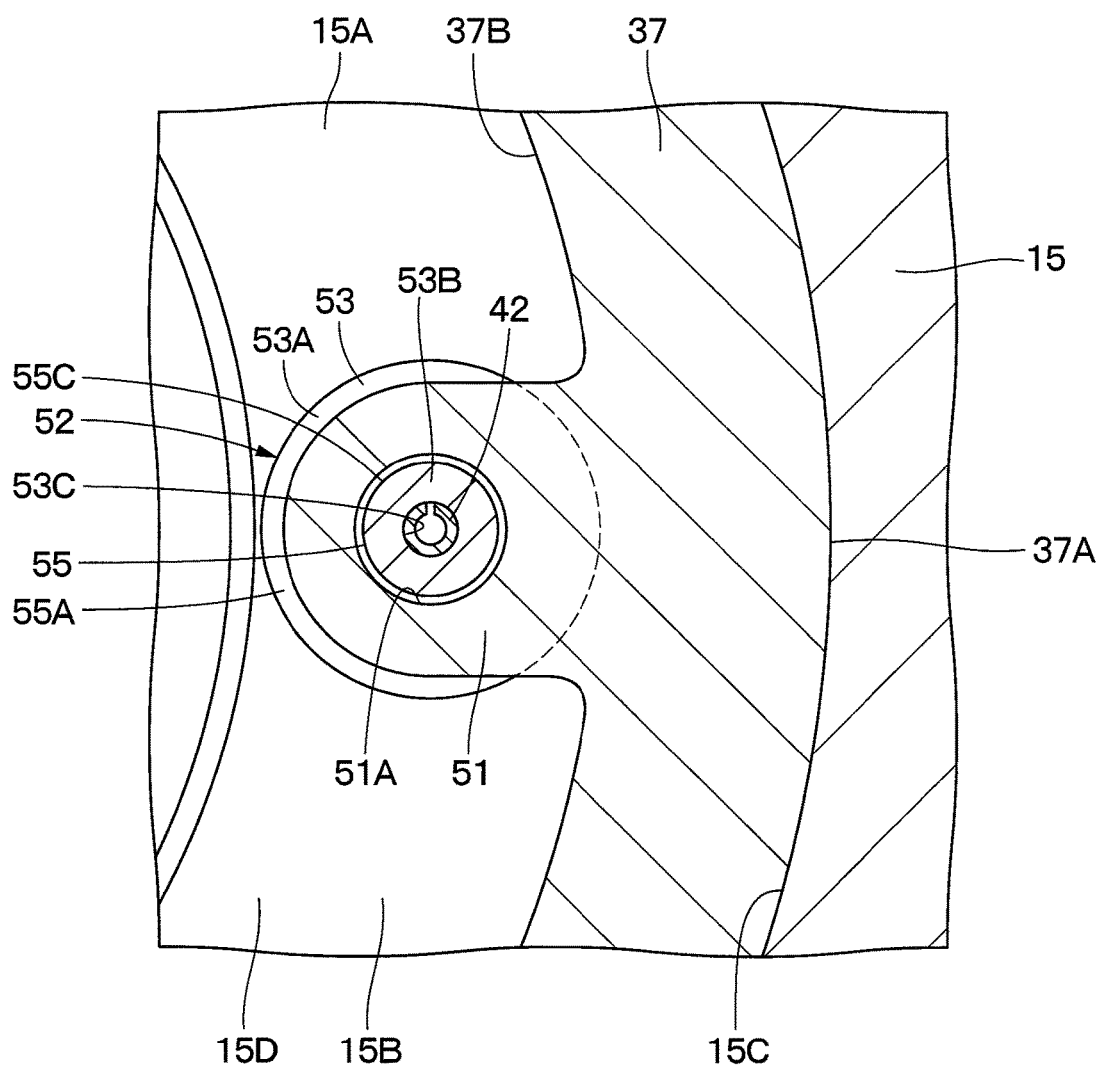
FIG. 14 is an enlarged cross sectional view as viewed in a direction of arrows XIV-XIV in FIG. 13.

Next, FIG. 13 and FIG. 14 show a second embodiment of the present invention. The second embodiment is characterized in that a projecting part of a brake mechanism is provided with a through hole as an engaging member insertion part that an engaging member penetrates in a left-right direction, and the engaging member is configured of a pair of division engaging bodies movably across the projecting part in the left-right direction. It should be noted that in the second embodiment, components identical to those in the first embodiment are referred to as identical reference numerals, and an explanation thereof is to be omitted.

In FIG. 13, a projecting part 51 is provided to project radially inward from the inner peripheral surface 37B as the inner diameter side of the piston 37 to face the partition wall 15A of the brake case 15. The projecting part 51 comprises a plurality of, for example, six projecting parts by equal intervals in the circumferential direction of the piston 37, for example.

Each of the projecting parts 51, as shown in FIG. 14, extends toward the radial inward and a tip end side of the projecting part 51 projects in a semi-circular shape. Each of the projecting parts 51 is provided with a through hole 51A penetrating in a left-right direction for causing an engaging member 52 to penetrate the through hole 51A. The through hole 51A configures an engaging member insertion part in the present invention. The through hole 51A is provided for respective small-diameter parts 53B, 54B of later-described division engaging bodies 53, 54 to be inserted in the left-right direction, the pin member 42 being inserted in the small-diameter parts 53B, 54B. The projecting part 51 having the circular through hole 51A can equally abut on an engaging member 52 (the respective division engaging bodies 53, 54). In addition, the circular through hole 51A can be easily processed.

The engaging member 52 is arranged in an inner diameter side of the piston 37 corresponding to each of the projecting parts 51. Each of the engaging members 52 is engaged with the projecting part 51 to be movable by the dimension G in the left-right direction. The engaging member 52 is configured of the first division engaging body 53 of a stepped disc shape arranged in the partition wall 15A-side of the brake case 15 and the second division engaging body 54 of a stepped disc shape to face the first division engaging body 53 in the left-right direction.

The pair of division engaging bodies 53, 54 are formed of disc-shaped large-diameter parts 53A, 54A, the columnar small-diameter parts 53B, 54B that are positioned in the center between the large-diameter parts 53A, 54A and project in a direction of opposing them, and pin insertion holes 53C, 54C that axially penetrate the center part of the large-diameter parts 53A, 54A and the small-diameter parts 53B, 54B. Here, the first division engaging bodies 53 and the second division engaging body 54 each are configured of a common component having the same shape. The first division engaging body 53 and the second division engaging body 54 are formed in a bobbin shape by a butt connection of the small-diameter parts 53B, 54B of each other. An entirely circumferential engaging groove 55 in a recessed groove shape is formed between the large-diameter part 53A of the first division engaging body 53 and the large-diameter part 54A of the second division engaging body 54 to open to the outer diameter side.

The entirely circumferential engaging groove 55 of the engaging member 52 is formed throughout the division engaging bodies 53, 54. Specifically, the entirely circumferential engaging groove 55 is configured of a side wall surface 55A of the first division engaging body 53 in the large-diameter part 53A-side, a side wall surface 55B of the second division engaging body 54 in the large-diameter part 54A-side, and a bottom surface 55C as an outer peripheral surface of the small-diameter parts 53B, 54B of the respective division engaging bodies 53, 54. As shown in FIG. 13, a groove width dimension of the entirely circumferential engaging groove 55, that is, a dimension between the side wall surfaces 55A, 55B is set to a value larger by the dimension G as similar to that of the first embodiment than a plate thickness dimension of the projecting part 51. Thereby, the projecting part 51 (piston 37) can move by the dimension G within the entirely circumferential engaging groove 55 to the engaging member 52.

The engaging member 52 is arranged across the projecting part 51 in a state where the small-diameter parts 53B, 54B of the respective division engaging bodies 53, 54 are inserted in the through hole 51A of the projecting part 51. In this state, the pin member 42 is inserted in the pin insertion holes 53C, 54C of the division engaging bodies 53, 54 and in the pin insertion hole 15E of the partition wall 15A in the brake case 15. Therefore, frictional resistances are applied between the pin member 42 and the pin insertion hole 15E of the partition wall 15A and between the pin member 42 and the pin insertion holes 53C, 54C of the engaging member 52 respectively.

In this case, the frictional resistance between the pin member 42 and the pin insertion hole 15E of the brake case 15 is set to a value smaller than the frictional resistance between the pin member 42 and the pin insertion holes 53C, 54C of the engaging member 52. Besides, the frictional resistance between the pin member 42 and the pin insertion hole 15E of the brake case 15 is set to a value smaller than the pressing force of the piston 37 at the braking and larger than the elastic force (pressing force) of the elastic member 38.

In this way, also in the second embodiment as configured above, an operational effect substantially similar to that of the first embodiment can be acquired. Particularly, according to the second embodiment, the engaging member 52 can be easily formed by butting the division engaging bodies 53, 54 as the common components. Further, the projecting part 51 having the circular through hole 51A can abut equally on the engaging member 52 (each of the division engaging bodies 53, 54), enhancing durability and the like.

Figure 15:
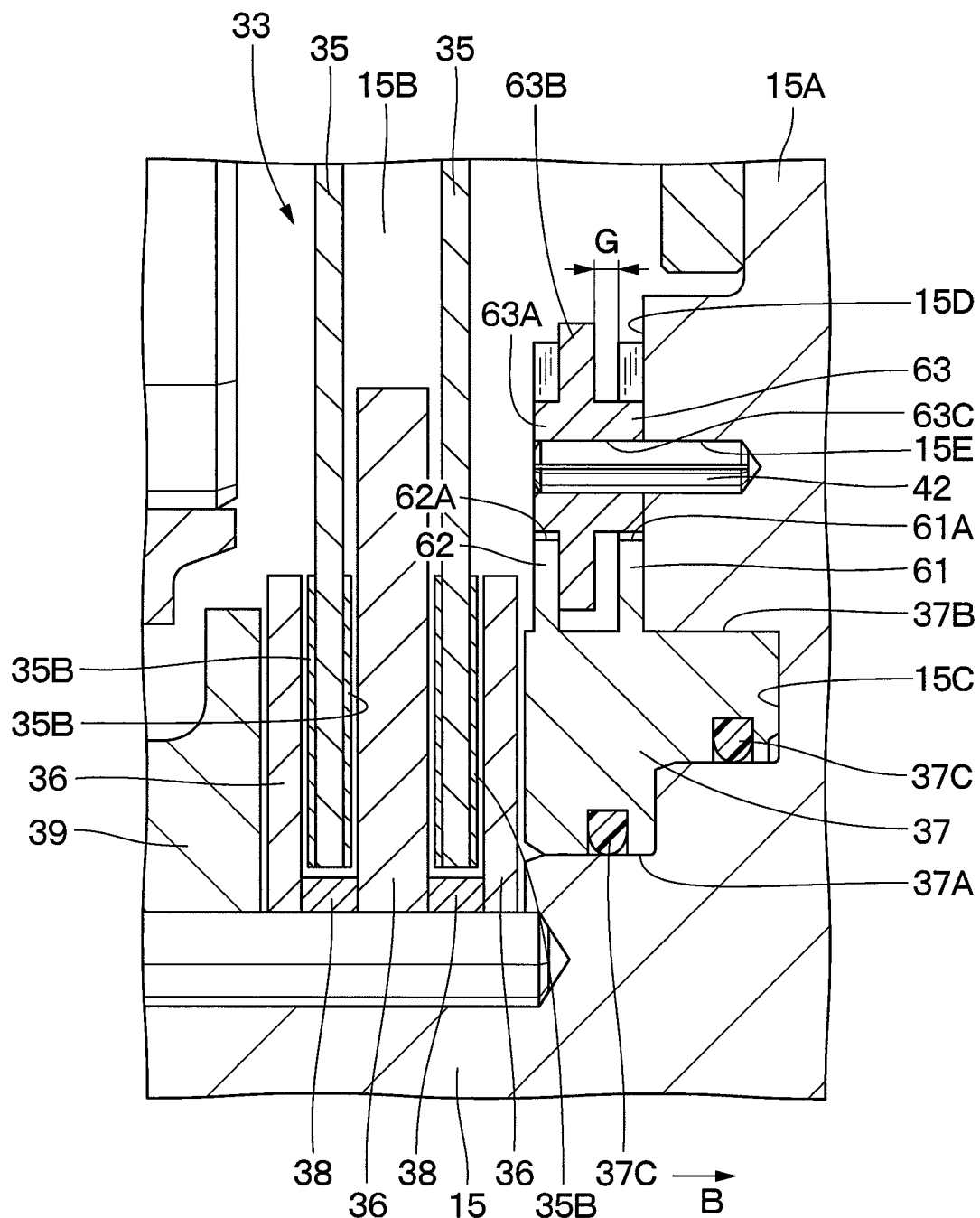
FIG. 15 is a cross sectional view showing a piston and an engaging member according to a third embodiment of the present invention, as viewed in a position as similar to that of FIG. 6.

Next, FIG. 15 shows a third embodiment of the present invention. The third embodiment is characterized in that a piston is provided with two projecting parts that are spaced in a left-right direction and the two projecting parts are movably arranged across an engaging member in the left-right direction. It should be noted that in the third embodiment, components identical to those in the first embodiment are referred to as identical reference numerals, and an explanation thereof is to be omitted.

In FIG. 15, projecting members 61, 62 are provided to project radially inward from the inner peripheral surface 37B as the inner diameter side of the piston 37. The projecting members 61, 62 are arranged in parallel to be spaced in the left-right direction as a moving direction of the piston 37. The projecting part 61 is arranged to face the partition wall 15A of the brake case 15 and the projecting part 62 is arranged to face the non-rotating disc 36. The projecting parts 61, 62 are configured of two projecting parts as one set, and a plurality of the sets are provided in the circumferential direction.

The projecting parts 61, 62 each are, as similar to the projecting part 40 according to the first embodiment, have a tip end side that is formed in an angular shape, and have engaging member insertion grooves 61A, 62A in a notched shape as an engaging member insertion part according to the present invention. A clearance dimension between the respective projecting parts 61, 62 is set to a value greater by the dimension G than a plate thickness dimension of a large-diameter part 63B of an engaging member 63 as described later.

The engaging member 63 is arranged in an inner diameter side of the piston 37 corresponding to each of the projecting parts 61, 62. Each of the engaging members 63 is engaged with the projecting parts 61, 62 to be movable by the dimension G in the left-right direction. The engaging member 63 is configured of a columnar small-diameter part 63A axially extending, a large-diameter part 63B in a large-diameter disc shape that is provided to be enlarged in diameter from an intermediate part of the small-diameter part 63A in the axial direction and a pin insertion hole 63C that axially penetrates a center part of the small-diameter part 63A.

In this case, in the third embodiment, the frictional resistance between the pin member 42 and the pin insertion hole 15E of the brake case 15 is set to a value smaller than the pressing force of the piston 37 at the braking. In addition, a frictional resistance between the pin member 42 and the pin insertion hole 63C of the engaging member 63 is set to a value larger than the frictional resistance between the pin member 42 and the pin insertion hole 15E of the brake case 15. It should be noted that the frictional resistance between the pin member 42 and the pin insertion hole 63C of the engaging member 63 may be set to a value smaller than the pressing force of the piston 37 at the braking.

Further, the frictional resistance between the pin member 42 and the pin insertion hole 15E of the brake case 15 and the frictional resistance between the pin member 42 and the pin insertion hole 63C of the engaging member 63 each are set to a value larger than the elastic force (pressing force) of the elastic member 38.

In this way, also in the third embodiment as configured above, an operational effect substantially similar to that of the first embodiment can be acquired. Particularly, according to the third embodiment, when the braking is released, the piston 37 can be retuned back by the dimension G in a direction of arrow B by the engagement between the projecting part 62 and the engaging member 63. Therefore, as similar to each of the aforementioned embodiments, the piston 37 can be arranged in a position where a proper brake operation can be performed while preventing contact between the respective discs 35, 36.

It should be noted that the first embodiment is explained by taking a case where the pin insertion hole 15E of the brake case 15, the projecting part 40, the engaging member 41 and the pin member 42 each are arranged in six locations spaced in the circumferential direction, as an example. However, the present invention is not limited thereto, but, for example, the pin insertion hole 15E, the projecting part 40, the engaging member 41 and the pin member 42 each may be arranged in two to five locations, or seven locations or more in the circumferential direction. In addition, the projecting part may be formed as an annular plate body and engaging member insertion grooves may be formed in a plurality of locations in the circumferential direction. The above configurations maybe applied likewise to other embodiments as well.

The first embodiment is explained by taking a case where the brake cases 15 are provided to line up in both the left and right sides of the differential case 14 and the brake mechanisms 33 are arranged to be neighbored to both the left and right sides of the differential mechanism 20, as an example. However, the present invention is not limited thereto, but a differential case and a brake case may be arranged as in a case of Japanese Patent Laid-Open No. 2010-137781 A, for example. That is, the brake cases may be provided in positions spaced in both the left and right sides of the differential case, for example, within wheels or near the wheels through axle tubes and the brake mechanism may be provided in the brake case. In this case, a partition wall of the brake case is a wall surface positioned in an inner side (axle tube side) of a vessel forming the brake case in the left-right direction. This configuration may be applied similarly to other embodiments.

Further, each of the aforementioned embodiments is explained by taking a case of the wheel loader 1 as a wheel type construction machine provided with the axle devices 12, 11 between the transmission 9 and the front and rear wheels 5, 4, as an example. The present invention is, however, not limited thereto, but, for example, may be applied widely to other wheel type construction machines such as a hydraulic excavator having wheels in the front and rear sides, a large-sized dump truck for mining, a tractor and the like.

DESCRIPTION OF REFERENCE NUMERALS

1: Wheel loader (Wheel type construction machine)
2: Rear vehicle body
3: Front vehicle body
4: Rear wheel
5: Front wheel
6: Working mechanism
7: Engine (Drive source)
11: Rear axle device
12: Front axle device
13: Casing
14: Differential case
14A: Differential mechanism accommodating room
15: Brake case
15A: Partition wall
15B: Brake mechanism accommodating room
15C: Piston insertion part
15E: Pin insertion hole
20: Differential mechanism
25: Rotating shaft
32: Axle shaft
33: Brake mechanism
35: Rotating disc
36: Non-rotating disc
37: Piston
37C: Seal member
38: Elastic member
40, 51, 61, 62: Projecting part
40A, 61A, 62A: Engaging member insertion groove (Engaging member insertion part)
41, 52, 63: Engaging member
41D, 53C, 54C: Pin insertion hole
41E, 55: Entirely circumferential engaging groove
42: Pin member
51A: Through hole (Engaging member insertion part)
53: First division engaging body (Division engaging body)
54: Second division engaging body (Division engaging body)
A: Moving direction of Piston at the Braking
B: Moving direction of Piston at the Non-braking, Direction of Elastic force of Elastic member
G: Proper dimension (Predetermined dimension) by which Piston is returned back at the Non-braking

The invention claimed is:
1. A wheel type construction machine comprising:
a vehicle body that is equipped with a drive source;
an axle device that is provided in said vehicle body and is connected to said drive source to drive/rotate wheels in both sides in a left-right direction; and
a working mechanism that is provided in said vehicle body, wherein
said axle device including:
a differential case that is arranged in an intermediate part in the left-right direction and an inside of which is a differential mechanism accommodating room;
left and right brake cases that are arranged in both left and right sides of said differential case, said left and right brake cases each being defined by a partition wall to said differential mechanism accommodating room in said differential case, and an internal part of said brake case being formed as a brake mechanism accommodating room;
a differential mechanism that is provided in said differential mechanism accommodating room in said differential case and distributes a drive force of said drive source to rotational shafts arranged in the left-right direction;
left and right axle shafts that transmit rotations of said left and right rotational shafts of said differential mechanism to said left and right wheels; and
left and right brake mechanisms that are provided in said respective brake mechanism accommodating rooms in said left and right brake cases to apply braking to the rotation of said rotational shaft in said differential mechanism, and
said brake mechanism including:
a plurality of rotating discs that are mounted on said rotational shaft and rotate together with said rotational shaft;
a plurality of non-rotating discs that are mounted in said brake case in a non-rotating state to face and be across said rotating disc in the left-right direction; and
an annular piston that is provided in said brake case to face said non-rotating disc and presses said non-rotating disc on said rotating disc to generate a braking force, characterized in that:
said brake mechanism includes:
a projecting part that faces said partition wall of said brake case and projects inward in a radial direction from an inner diameter side of said piston;
an engaging member that is arranged in the inner diameter side of said piston in a state of being movably engaged with said projecting part by a predetermined dimension in the left-right direction to said projecting part of said piston; and
a pin member that is provided between said partition wall and said engaging member for movably supporting said engaging member in the left-right direction to said partition wall of said brake case, wherein
at least one frictional resistance of a frictional resistance between said pin member and said partition wall of said brake case and a frictional resistance between said pin member and said engaging member is set to a value smaller than said pressing force of said piston at the braking, and
said projecting part of said piston is provided with an engaging member insertion part in which said engaging member is movably inserted in the left-right direction.
2. The wheel type construction machine according to claim 1, wherein an elastic member is provided between said non-rotating discs to apply an elastic force in a direction in which said non-rotating discs are away from each other, and the frictional resistance between said pin member and said partition wall of said brake case and the frictional resistance between said pin member and said engaging member each are set to a value greater than the elastic force of said elastic member.

3. The wheel type construction machine according to claim 1, wherein said engaging member insertion part provided in said projecting part of said piston is provided with an engaging member insertion groove in a notched shape for penetration of said engaging member, and said engaging member is provided with an entirely circumferential engaging groove that is movably engaged with said engaging member insertion groove in the left-right direction.

4. The wheel type construction machine according to claim 1, wherein said engaging member insertion part provided in said projecting part of said piston is provided with a through hole for penetration of said engaging member, and said engaging member is configured of a pair of division engaging bodies across said projecting part to be movable in the left-right direction.

* * * * *